(12) United States Patent
Robertson et al.

(10) Patent No.: US 12,721,274 B2
(45) Date of Patent: Sep. 1, 2026

(54) ROBOT FRUIT PICKING SYSTEM

(71) Applicant: DOGTOOTH TECHNOLOGIES LIMITED, Royston (GB)

(72) Inventors: Duncan Robertson, Royston (GB); Edward Herbert, Royston (GB); Matthew Cook, Royston (GB); Frank Tully, Royston (GB); Chris Padbury, Royston (GB); Thomas Redman, Royston (GB); Tom Hellier, Royston (GB); Nick Scott, Royston (GB); Adrian Dunlop, Royston (GB); Ruan Kendall, Royston (GB)

(73) Assignee: DOGTOOTH TECHNOLOGIES LIMITED, Royston (GB)

( * ) Notice: Subject to any disclaimer, the term of this patent is extended or adjusted under 35 U.S.C. 154(b) by 420 days.

(21) Appl. No.: 18/255,463

(22) PCT Filed: Dec. 1, 2021

(86) PCT No.: PCT/GB2021/053143

§ 371 (c)(1),
(2) Date: Jun. 1, 2023

(87) PCT Pub. No.: WO2022/118021

PCT Pub. Date: Jun. 9, 2022

(65) Prior Publication Data

US 2024/0373787 A1 Nov. 14, 2024

(30) Foreign Application Priority Data

Dec. 1, 2020 (GB) ..................................... 2018949
Jul. 23, 2021 (GB) ..................................... 2110653
Oct. 27, 2021 (GB) ..................................... 2115455

(51) Int. Cl.
*A01D 46/30* (2006.01)

(52) U.S. Cl.
CPC .................................... *A01D 46/30* (2013.01)

(58) Field of Classification Search
CPC ......... A01D 46/30; A01D 46/24; B25J 5/007; B25J 11/0045; B25J 19/023
See application file for complete search history.

(56) References Cited

U.S. PATENT DOCUMENTS

2016/0243696 A1 8/2016 Kahani
2016/0309650 A1 10/2016 Jens
2019/0029178 A1* 1/2019 Russel ................... A01D 46/30
2019/0261566 A1* 8/2019 Robertson ................. G06T 7/50

(Continued)

OTHER PUBLICATIONS

International Search Report, dated Apr. 13, 2022, issued in priority International Application No. PCT/GB2021/053143.

*Primary Examiner* — Brad Harcourt
(74) *Attorney, Agent, or Firm* — Saul Ewing LLP

(57) ABSTRACT

There is provided a robot fruit picking system comprising an autonomous robot. The system includes a picking arm or other end effector positioning device; and an end effector mounted on the picking arm configured to either cut a fruit or stalk or stem for a specific fruit or bunch of fruits or pluck that fruit or bunch, and to transfer the fruit or bunch to a storage buffer subsystem. The storage buffer subsystem is configured to receive the fruit or bunch, and to transfer the fruit or bunch to a transportation or inspection or storage subsystem.

25 Claims, 14 Drawing Sheets

(56) References Cited

U.S. PATENT DOCUMENTS

| | | | | |
|---|---|---|---|---|
| 2020/0008355 | A1 * | 1/2020 | Nir | A01D 46/30 |
| 2020/0281122 | A1 | 9/2020 | Mor | |
| 2023/0026679 | A1 * | 1/2023 | Matarazzo | G06V 10/7715 |
| 2023/0068237 | A1 * | 3/2023 | Knopf | B25J 15/10 |

* cited by examiner 22
23
21
FIGURE 2B

ROBOT FRUIT PICKING SYSTEM

CROSS-REFERENCE TO RELATED APPLICATIONS

This application claims the priority of International Application No. PCT/GB2021/053143, filed Dec. 1, 2021, which claims priority to GB Application No. 2018949.4, filed Dec. 1, 2020; GB Application No. 2110653.9, filed Jul. 23, 2021; and GB Application No. 2115455.4, filed Oct. 27, 2021, the entire contents of which being fully incorporated herein by reference.

BACKGROUND OF THE INVENTION

1. Field of the Invention

The field of the invention relates to systems and methods for controlling autonomous robot(s), and in particular to systems and methods for robotic fruit picking.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

Soft fruit picking robots may pick fruits by severing and gripping the stalk by which the individual fruit or bunch is attached to the plant. One requirement is physical selection of a stalk of interest, and this may be accomplished by sweeping a suitable end effector through a volume of space that (i) contains the stalk belonging to the fruit of interest and (ii) does not contain any other stalks, and then close, trapping, cutting, and gripping the stalk. Finally, the picked fruit, now held by its severed stalk, may be carried to a punnet and then released.

One such end effector design resembles a harpoon (i.e. a spear or 'jaw' with a single barb or hook at its tip) that is swept sideways past the stalk of interest. FIG. 1 shows an illustrative example of an existing design of fruit picking end effector that use a single hooked jaw. The hooked jaw (1, which resembles a harpoon in some embodiments) is swept perpendicular to and into the stalk by the action of a robot arm so the stalk is gathered by the hooked jaw. Then the cutter/gripper assembly (2,3,4; shown without the top part of its housing) is pushed forwards against the curved hook, trapping the stalk against it and simultaneously cutting and gripping it.

A moveable cutter and gripper might then close on the stalk, trapping the stalk against the barb (or hook) and simultaneously cutting and gripping it. One appeal of this design is that the volume swept out by the end effector can be adapted for each picked fruit by altering the trajectory of the picking arm with respect to the stalk. For example, the hooked jaw might be moved through a smaller swept volume if there are nearby obstacles because this decreases the likelihood of selecting the wrong stalk by accident (albeit at the expense of a reduction in robustness to uncertainty in the position of the target stalk, e.g. due to wind sway). However, one disadvantage of this approach is that the sweeping out of the volume must be achieved by the action of the robot arm—which is likely to be capable of only slow arm motion due to the need to accelerate and decelerate its large mass.

There is therefore a need for an improved end effector that is easy to use in order to perform multiple functions, such as gripping or cutting a fruit.

Further, after picking, the picking arm usually carries a fruit to a quality control chamber or directly into punnets for storage. Packaging operations are therefore often accomplished using the picking arm itself. However this is not an optimal or efficient way of using the picking arm and/or of allocating fruits into punnets.

The present invention addresses the above vulnerabilities and also other problems not described above.

SUMMARY OF THE INVENTION

A first aspect of the invention is a robot fruit picking system comprising an autonomous robot including:

- a picking arm or other end effector positioning device;
- an end effector mounted on the picking arm configured to either cut a fruit or stalk or stem for a specific fruit or bunch of fruits or pluck that fruit or bunch, and to transfer the fruit or bunch to a storage buffer subsystem;
- and in which the storage buffer subsystem is configured to receive the fruit or bunch, and to transfer the fruit or bunch to a transportation or inspection or storage subsystem.

BRIEF DESCRIPTION OF THE FIGURES

Aspects of the invention will now be described, by way of example(s), with reference to the following Figures, which each show features of the invention:

FIG. 2B shows a side view of a fruit picking end effector comprising two barbed jaws and a cutter assembly.

DETAILED DESCRIPTION

The ideas described below are applicable to the automated picking of a variety of different crops that grow on plants (like strawberries, tomatoes), bushes (like raspberries, blueberries, grapes), and trees (like apples, pears, logan berries). In this document, the term fruit or berry should be taken to include all fruits, vegetables, and other kinds of produce or material that can be picked from plants (including e.g. nuts, seeds, vegetables, excess foliage) and plant shall be taken to mean all kinds of fruit producing crop (including plants, bushes, trees). For fruits that grow in clusters or bunches (e.g. grapes, blueberries), fruit may refer to the individual fruit or the whole cluster. Often berry fruits are stored in punnets, but the word punnet should be taken to mean any container used to store picked fruit.

The description is organized in the following categories:

Section 1. A fruit picking end effector

Section 2. Carousel for the inspection and packaging of picked fruit

Section 3. Controlling a robot team

Section 4. A method of determining the ripeness of a fruit

Section 5. Storing system for multiple robots

Section 6. Lean compensation subsystem

Section 1. A Fruit-Picking End Effector

The following describes a robot arm end effector intended for picking fruits and other types of produce that grow on stalks (or possibly branches), e.g. strawberries, raspberries, apples, bananas, grapes. Such an end effector might usefully be equipped onto a fruit picking robot arm, or other end effector positioning device.

An end effector comprising two or more barbed jaws is shown in FIGS. 2 and 3. The two or more barbed jaws are, in their open position, sprung apart (see FIGS. 2, 3).

Figure 1:
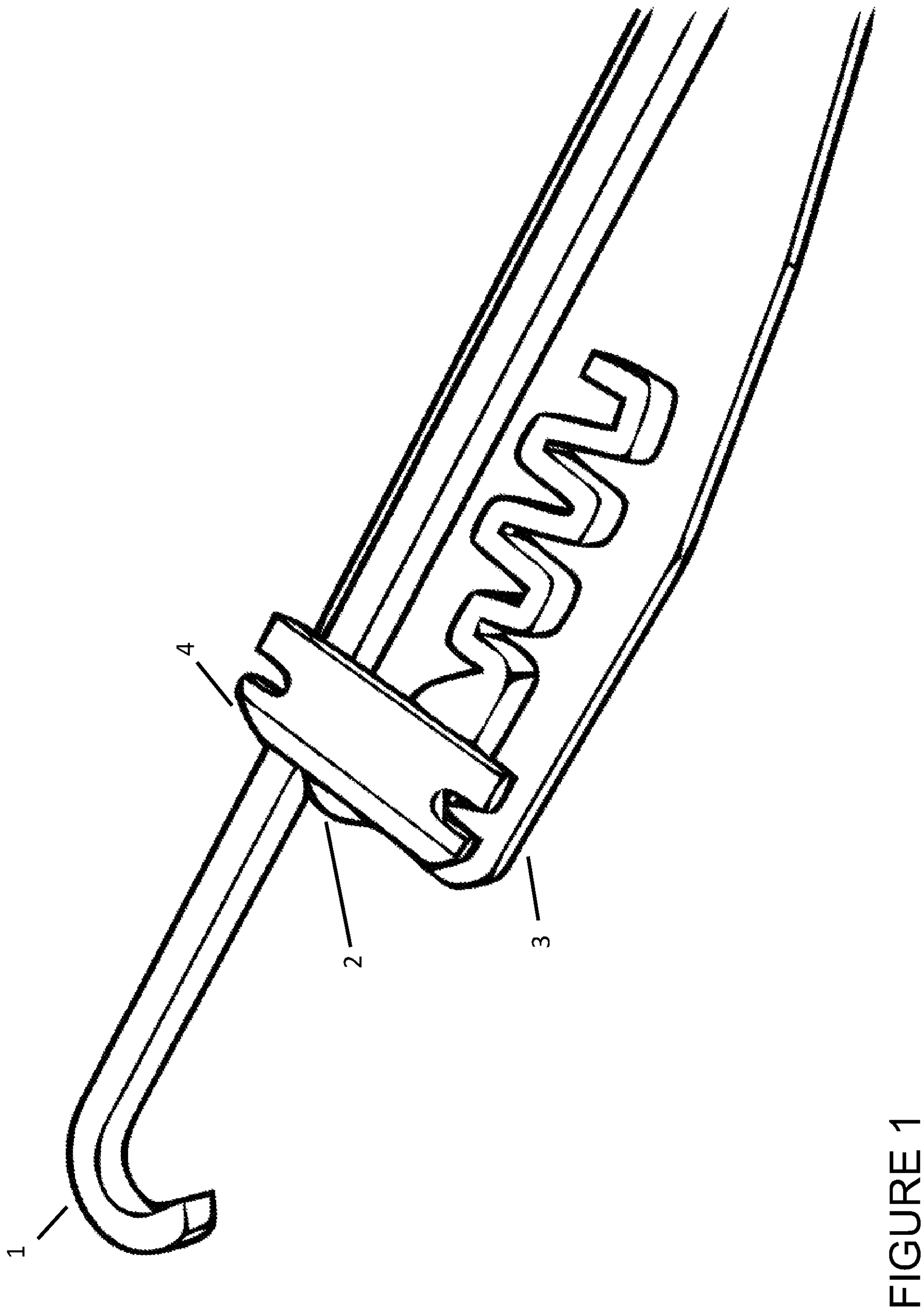
FIG. 1 shows an illustrative example of an existing design of fruit picking end effector that use a single hooked jaw.
Figure 2A:
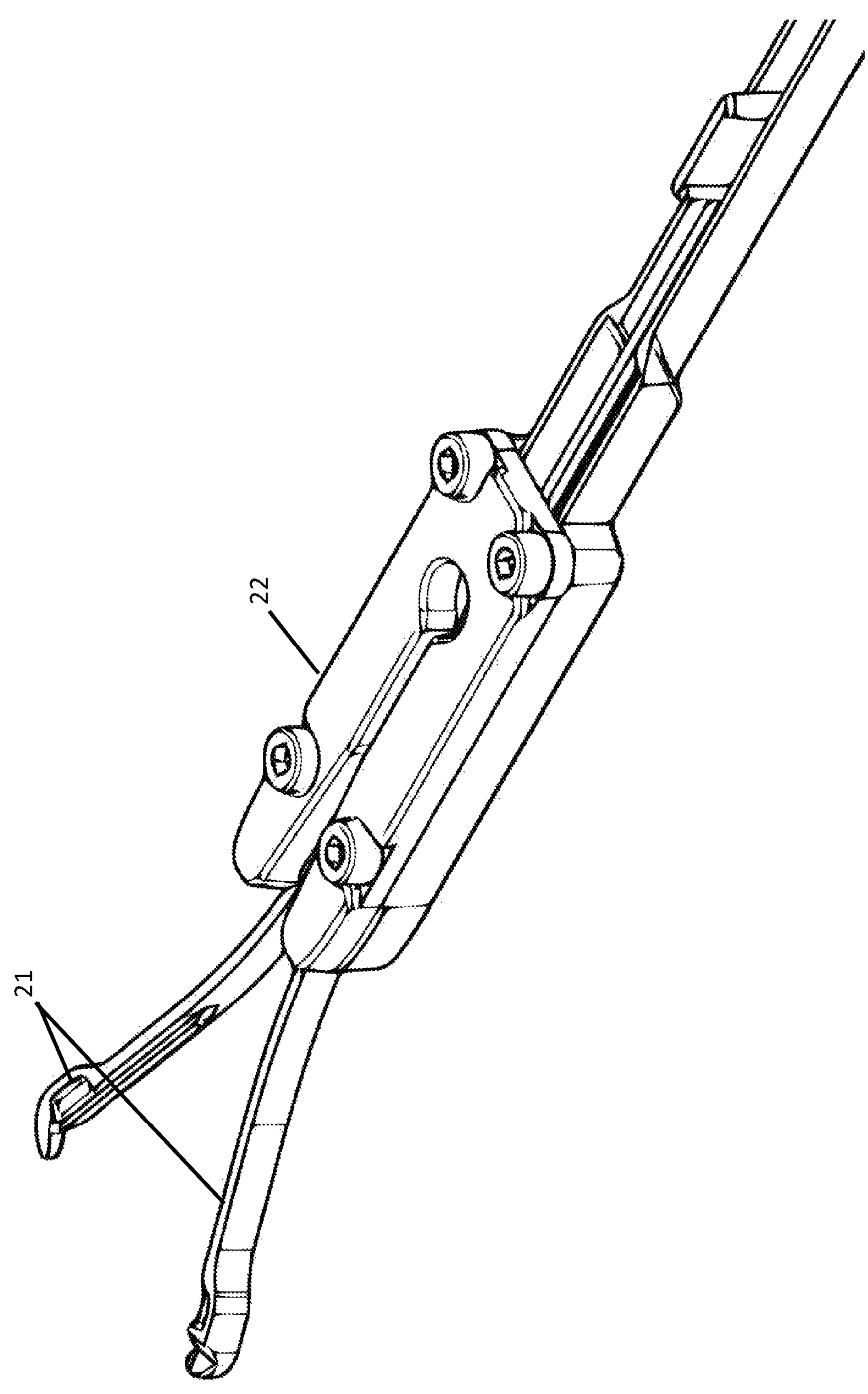
FIG. 2A shows a perspective view of a fruit picking end effector comprising two barbed jaws and a cutter assembly.
Figure 2B:
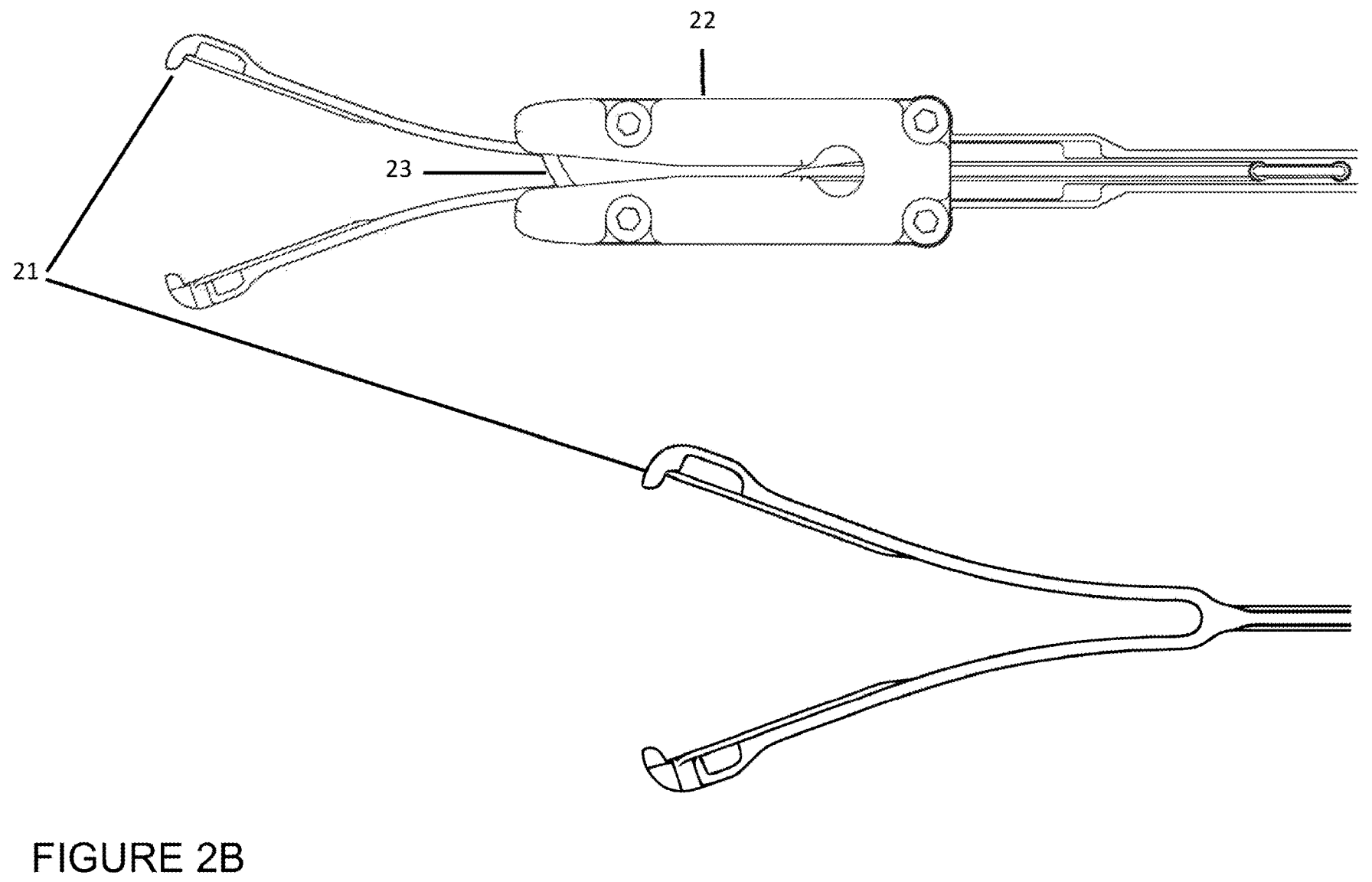

FIGS. 2A and 2B show a fruit picking end effector comprising two barbed jaws (21) designed normally to spring open and a cutter assembly (22) that slides along them. A robot arm or end effector positioning system positions the barbed jaws on either side of the stalk to be picked, then the cutter assembly is pushed forwards by the action of a suitable actuator, e.g. a servo. This has the effect of squeezing together the barbed jaws, both enclosing and gripping the stalk and pulling it onto a cutting blade, thereby cutting it with the enclosed cutting blade (23).

Figures 3A, 3B:
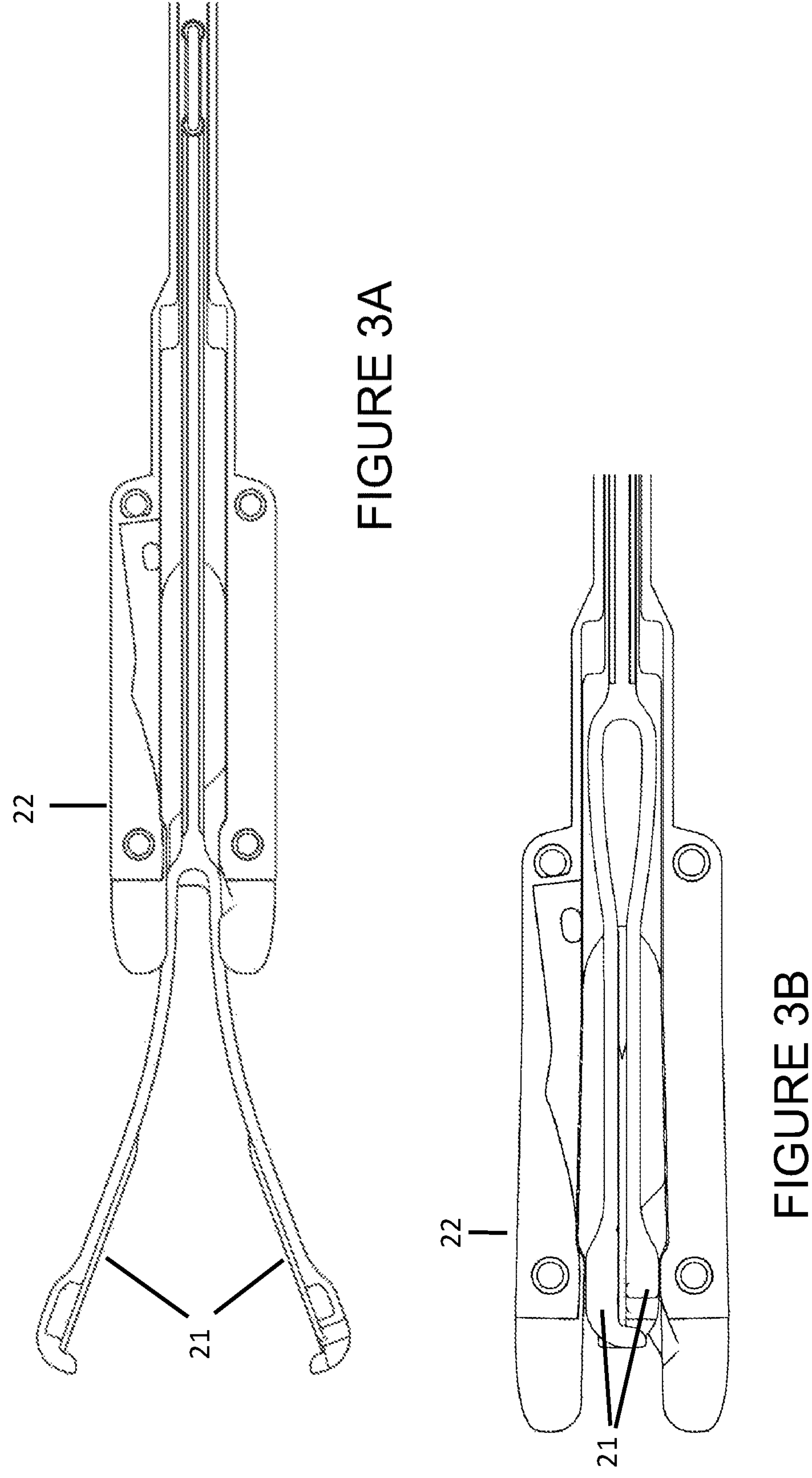
FIG. 3A shows the end effector in an open configuration.
FIG. 3B shows the end effector in a closed configuration.

FIG. 3A shows the end effector in an open position and FIG. 3B shows the end effector in a closed position. In the open position, the jaws (21) spring open; in the close position the jaws are squeezed shut by the cutter assembly (22), which slides along the jaws under the action of an actuator such as a servo. The aperture of the open end effector may be determined dynamically by the position of the cutter assembly.

In this design, the picking arm (or other end effector positioning device) positions the end effector's open jaws so that the stalk is enclosed by them. Then one or more suitable actuators (e.g. a servo) may be used simultaneously (i) to push the cutter towards the barbs and (ii) to squeeze the jaws together by sliding a narrow aperture along them. Because the picking (gripping-and-cutting) action is effected by a single actuator moving only the lightweight jaws and not by the motion of the more massive robot arm, this can be achieved very much more quickly than with the single hooked jaw design. Another benefit of the approach is that the cut stalk is trapped between the two or more jaws so that actuator force is no longer required after the stalk has been cut.

Having picked a fruit, the robot may deposit it elsewhere, e.g. into a punnet. The release of the picked fruit can be achieved simply by moving the cutter assembly back away from the barbed tips of the jaws, allowing the jaws to spring open and release the berry. So that the berry is released reliably, it may be useful to tune the surface area of contact with the stalk by varying the height of the jaws to achieve a beneficial trade-off between holding force and pressure.

This approach gives rise to several related features as follows:

1 Before the end effector approaches the stalk, its aperture (i.e. the distance between the two barbed jaws) may be adapted dynamically to maximize the probability of picking success against some measure. For example, a narrower aperture may be used if there are obstacles near the stalk of interest, such as other stalks. This decreases the chances of picking the wrong stalk at the expense of slightly less robustness to uncertainty in the position of the target stalk, e.g. due to wind sway.

2. The target fruit and the picking position on its stalk may be determined by a computer vision system, for example one that uses a stereo camera. By ensuring that the barbed tips of the jaws are visible in the camera frame, their 3D position may be inferred by detecting their 2D image positions. This might be achieved e.g. by using a computer vision approach to detect the position of suitable fiducial markers on the jaws or their image silhouettes. Then information about the 3D position of the jaws in the camera frame can be used to refine the positioning of the robot arm to improve the accuracy with which the jaws are positioned with respect to the stalk. Repeated re-calibration at intervals may be useful in achieving robustness to change in position of the end effector, for example due to deformation as a result of collision or aging or wear. This approach can be used to calibrate both the position of the end effector in the camera frame and also the relationship between the position of the cutting assembly and the aperture of the end effector-so that the picking aperture can be tuned with greater accuracy.

3. The barbed jaws may be only partially closed around a stalk so as to encircle the stalk without applying significant force to it or cutting it. This allows the stalk (and attached fruit) to be moved so as to allow the computer vision system to gain confidence that the right stalk has been selected before the attached fruit is permanently severed from the plant. If the wrong stalk is selected (e.g. a stalk belonging to an unripe berry) then the stalk can be released without damage to the plant.

4. To facilitate rapid release of a picked stalk from the end effector, a useful feature is a spring-actuated opening mechanism for the jaws. This might be achieved, e.g. by using a powered actuator to close the cutter/gripper assembly against a spring force. Then, when power to the actuator is removed, the end effector springs open quickly, releasing the held stalk. (Alternatively, it may be useful to employ a spring-actuated closing mechanism, e.g. by using the powered actuator to open the jaws against a spring force).

5. Sometimes a picking attempt fails, for example because disturbance caused by the motion of the robot arm or wind pushes the berry out of the way of the end effector jaws during picking. Therefore a useful feature is a computer vision system to detect whether or not there is a berry in the end effector jaws after picking. If there is not, then it may save time to continue picking rather than transporting the non-existent berry supposedly in the jaws to a punnet or inspection system. Another feature is to use the computer vision system to detect the other failure cases, such as the case that the picked berry is damaged or rotten or that multiple stalks have been picked simultaneously. In these failure cases, it may be desirable not to carry the berry to the inspection system or punnet, e.g. to avoid contamination of the inspection system.

Adapting a Picked Stalk Length

An approach for adapting picked stalk length at the point of picking using an end effector is designed firstly (i) to encircle the stalk without severing it, secondly (ii) to select a picked stalk length by sliding the end effector along the stalk towards or away from the fruit (still without severing it), and finally (iii) to server the stalk at a particular target length. By this means, the fruit can be picked with a stalk length compatible with the requirements of supermarket customers (e.g. strawberries are sometimes required by supermarket retailers to have a stalk length of between 8 and 15 mm).

This approach may be combined with the end effector described above, and more generally with any other type of end effector.

Section 2. Carousel for the Inspection and Packaging of Picked Fruit

Although the examples provided in this section relate specifically to fruit picking robots, the general approach is more broadly applicable to systems that are configured to provide multiple sequences of operations preformed with robots, such as crop packaging robots, especially where then are advantages if those sequences can be performed asynchronously or otherwise de-coupled. It particularly relates to autonomous robots working in natural or less structured environments, in which it would be beneficial to smooth out load variations from one robot to another one, or from one robot arm to another robot arm or subsystem (e.g., variations in the rate at which different robots complete their tasks).

Hand-Off for Packaging

Fruit picking robots typically use one or more a movable robotic arms with an end effector or end effectors that can detach the fruit from the plant and grasp the fruit (or its stalk or stem) for transfer. After picking, it may be necessary to carry the fruit to an inspection station and deposit the fruit in a specific punnet (or other such container). For fruits like raspberries, it may also be necessary to separate the body of the fruit from its receptacle. In what follows, these various post-pick operations will be referred to collectively as packaging.

Typically, packaging operations are accomplished using the picking arm itself. However, since the complexity of the arm required to pick the fruit may be greater than necessary for packaging, it may be advantageous to hand off the fruit to another, simpler robot arm or transport mechanism (a packaging arm) that is capable of carrying the fruit into the inspection system and thence to an appropriate punnet. This approach allows better utilisation of the more complex or faster (and therefore more expensive) picking arm. Another significant benefit is the possibility of moving the inspection station and punnets out of the working volume of the picking arm (or arms), thereby facilitating the use of a larger portion of its (their) working volume for picking.

Carousel

In the steady state, a packaging arm as described above must be capable of processing fruit as fast as the picking arm or arms can pick fruit. Unfortunately, the time between successive picks is likely to be variable, which might sometimes necessitate a picking arm waiting for the packaging arm to be ready to receive the next picked berry, thereby reducing utilization of the picking arm.

Figure 4:
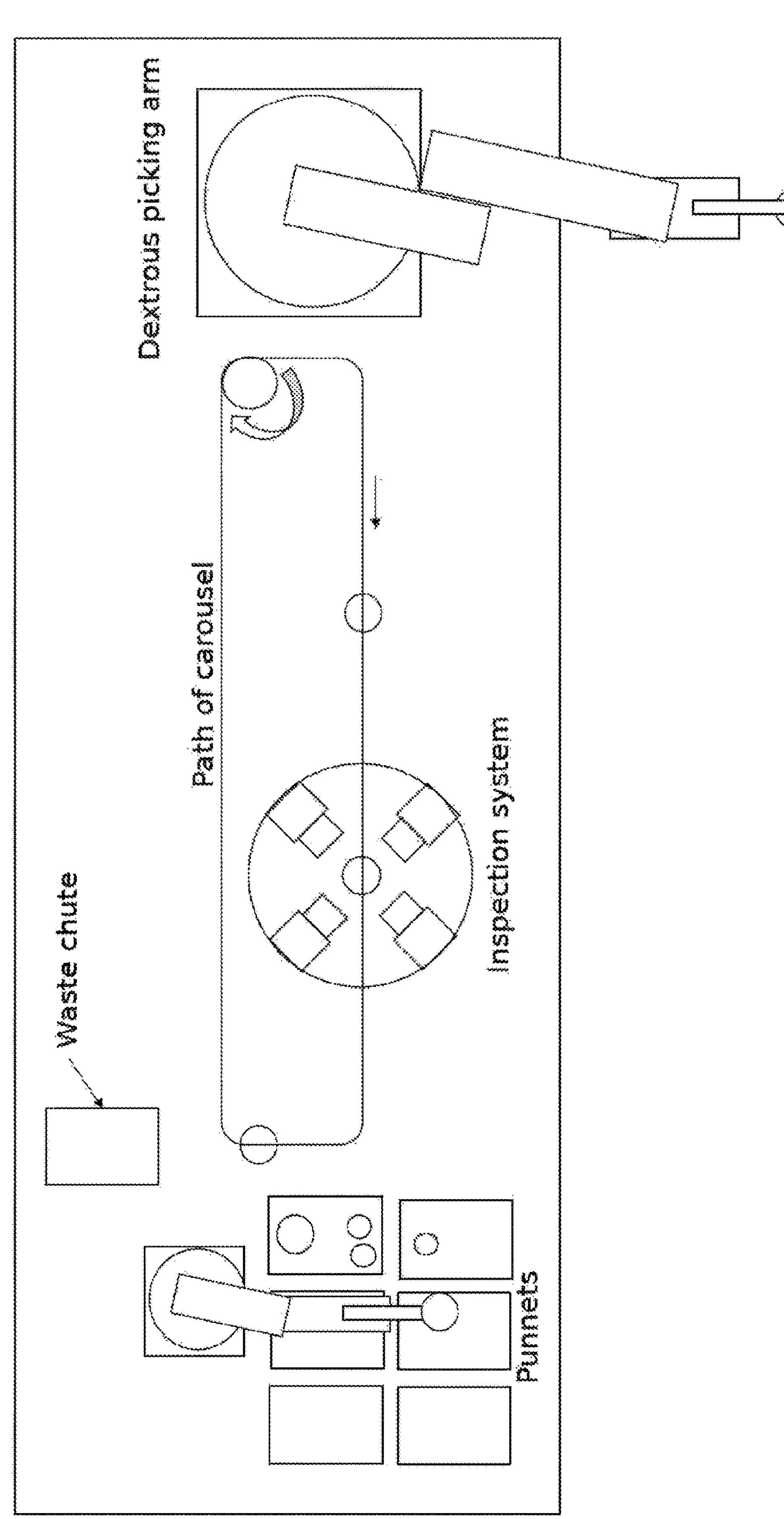
FIG. 4 shows a robot fruit picking system including a picking arm, a carousel and a packaging arm.

This problem motivates another valuable feature, which is to provide a berry storage buffer between the picking arm and packaging arm, enabling the picking arm and packaging arm to each work at their own, optimum rate. In principle, this buffer might take the form of a simple conveyer belt in the same manner as a baggage carousel at an airport. This is illustrated in schematic form in FIG. 4.

In practice however, this approach creates a hygiene issue because diseased fruit contact the same surface as healthy fruit. For soft fruits such as strawberries and raspberries, contact with the conveyer belt might also give rise to bruising, particularly at high ambient temperatures—and such damage can dramatically reduce the shelf life of the fruit. A solution is to design the carousel to hold the fruit by its stem, rather like cars on a ski lift.

Figure 5:
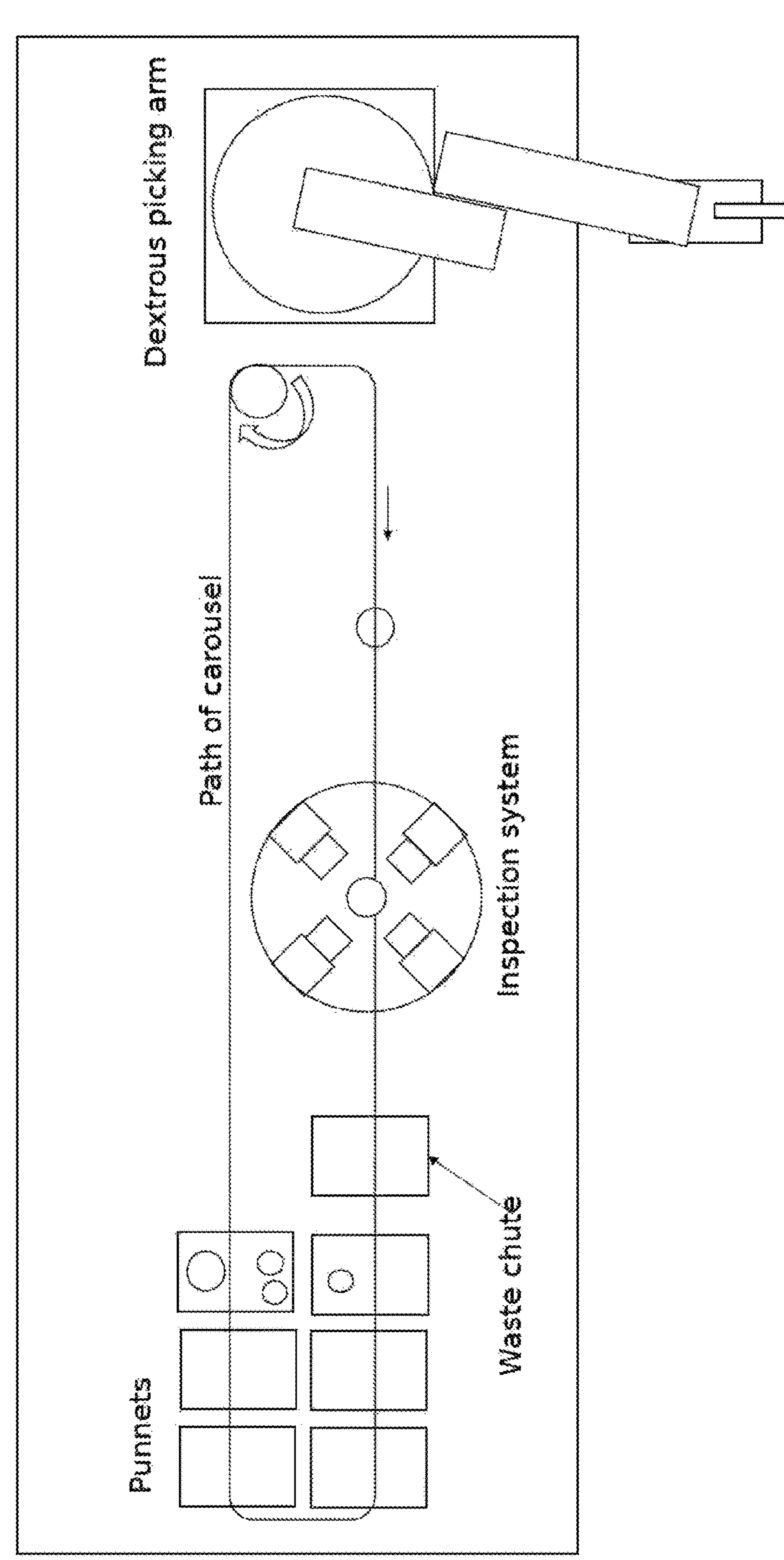
FIG. 5 shows a robot fruit picking system including a picking arm, a carousel that carries a fruit to individual punnets.

A further feature is to combine the function of the carousel and the packaging arm, by routing the carousel (i) into the working volume of the picking arm, optionally (ii) into an inspection station, and (iii) so as to allow fruit to be carried to each individual punnet. This idea is illustrated in schematic form in FIG. 5. One additional requirement is that the berry can be released from the carousel in such a way that it can be deposited into its intended punnet, e.g. falling under gravity. In general, the carousel might be oriented other than horizontally.

Various embodiments of this idea are possible. We might combine one or more picking arms with e.g.:

- one or more packaging arms capable of receiving a picked berry from the picking arm(s) and moving it to the inspection system and the punnet or waste chute;
- one or more statically positioned berry holders, similar to wall-mounted tool holders;
- a single carousel capable of receiving picked berry from the picking arm(s), storing it and carrying it to the inspection system or punnet or waste chute; or
- a magazine capable of receiving the picked berry from the picking arm and storing it, and a packaging arm capable of receiving the berry from the magazine and transferring it to the punnet or waste chute.

A possible benefit of using a magazine system with a separate packing arm is that greater space efficiency can be achieved. A suitable magazine might be cylindrical or linear in form, similar to the two types of magazines commonly used to hold photographic transparencies in (now old-fashioned) slide projectors. In what follows, the word carousel should be interpreted to include magazine-like embodiments of a fruit storage buffer.

Naturally, these ideas can be extended to robots that include multiple picking arms, inspection stations, punnets, waste chutes, etc. in various geometric configurations. One possibility is to arrange punnets (or trays of punnets) into vertical stacks spaced to allow the carousel to pass between the trays. In this case, the carousel might be configured to move the berries along a spiral path.

In general, the carousel might be routed in such a way as to carry picked fruits to or from locations on a (possibly moving) robot arm, e.g. from a location on the moving picking arm itself (perhaps where a picked fruit can be conveniently and efficiently handed off from the picking end effector to the carousel) to another convenient location on the robot. A possible advantage of using a carousel to carry picked fruit along the picking arm itself is that the handoff point can be moved closer to the current location of the picking end effector, reducing the amount of unproductive time spent by the picking arm carrying a recently picked berry to the handoff point.

Note that in general the carousel needs only to achieve useful relative motion of the picked fruit with respect to the picking arm, inspection system, and punnet locations. For example, in a possible embodiment, a carousel might be used to move the punnets relative to the picked fruit instead of moving the picked fruit relative to the punnets (considering motion in the coordinate frame of the robot chassis or a crop row).

Note also that in general the carousel does not need to be mounted to the picking robot itself. For example, it might be mounted to another robot or to the infrastructure used to support or enclose the crop, e.g. the tabletop and trellis systems used to support strawberries and raspberries, or the structural members used to support a polytunnel or glasshouse. By this means, robotically picked fruit can be transferred to another location for post processing, e.g. obviating the need to retrieve punnets of picked fruit from the picking robot itself.

Distribution of Berries Among Punnets ('Punnetization')

When using a buffer capable of storing fruit temporarily before it is deposited into a punnet (e.g. a carousel or magazine or other embodiment), it is not necessary for the berry most recently picked by the picking arm to be deposited into the punnet before a subsequent berry is picked.

As a simplistic illustration of why this may be beneficial, consider a berry packaging system designed to fill punnets with berries up to a minimum target weight of 500 g. Now imagine that two available punnets have 22 g and 20 g of space remaining. Consider that a picking arm picks berries weighing 10 g, 11 g, and 22 g. Without a buffer (or any knowledge of the weight of the second or third berries to be picked), the picking arm might reasonably place the first 10 g berry in the punnet with 25 g of space remaining. But this is sub-optimal because there is then no way of filling both punnets with the remaining berries. With a buffer providing storage for at least three berries, three berries can be picked and weighed before the system has to commit to placing any berry in a punnet. Then the first berry might more optimally be placed in the punnet with 25 g of space remaining because then the subsequent berries can be placed so as to fill the remaining space and reduce overfill.

This motivates several consequent features centred around the idea of using the buffer to facilitate more optimal distribution of berries among punnets. One example is filling punnets with fruits with only similar shape or size or diameter.

Different customers or retailers may have different requirements or rules. Using the buffer enables the allocation of specific fruits into punnets that are specifically filled to meet a retailer requirement. As an example, the finest fruits meeting the best requirements may go to some retailers, or be used for their premium ranges, and the remaining fruits may go to other retailers, or be used for their economy ranges.

Hence having a buffer and not having to commit to allocate a particular picked fruit into a particular punnet until later provides a more optimal way of meeting different requirements or rules.

Depending on the contract between the grower and the customer, the customer may be penalised in some way for supplying punnets not meeting these requirements, reducing the grower's profit. For examples whole punnets, or trays, or batches of trays may be rejected by the customer. The commercial outcome can be modelled by a cost function that is a monotonically decreasing function of the grower's expected profit from supplying a given punnet or tray to a customer. For example, a simple punnet cost model depends on a linear combination of factors as follows:

$$\text{Cost} = w_0 e + w_1 \cdot u + w_2 \cdot c + w_3 \cdot d$$

where e means the excess weight of fruit in the punnet compared to the target weight, u is an indicator variable that is 1 if the punnet is underweight or 0 otherwise, and c is a measure of the proportion of fruits or berries that are outside of the desired range of diameters (or the degree to which the distribution of fruit diameters differs from the ideal). Finally, d is a measure of how long it will take to place a strawberry in a particular punnet, which is a consequence of how far the arm will have to travel to reach the punnet. The weights $w_i$ reflect the relative importance of these factors to profitability, e.g. $w_1$ reflects the cost of a tray containing an underweight punnet being rejected weighted by the risk that an additional underweight punnet will cause the tray to be rejected; similarly, $w_3$ reflects the impact on overall machine productivity of spending more time placing strawberries in more distant punnets. These weights might be tuned e.g. by theoretical or empirical analysis of existing customer quality control process.

An important observation is that distributing the same picked berries differently amongst punnets could give rise to a different loss according to the cost function. As an illustration, many customers impose a minimum weight per punnet. Typically, the grower must ensure that each punnet contains at least this minimum weight of fruit, allowing a margin for error because berries are indivisible. But if one algorithm for placing berries in punnets can approach the minimum weight threshold more closely on average than another, then it will yield higher profit for the grower.

A useful feature is a strategy for automating the allocation of picked fruit into multiple punnets (or a waste container) based on size and quality measures to minimize the statistical expectation of total cost according to a metric like the one described earlier, i.e. to maximize expected profitability for the grower. Compared to human pickers, a software system can maintain a more accurate model of the contents of many punnets simultaneously. Thus, the robot can place picked fruit in any one of many partially filled punnets, or discard picked fruit that is of insufficient size or quality. However, it is challenging to place berries to minimize cost because:

a robot may have room to operate with a limited number of partially filled punnets simultaneously;

as the punnets are filled, the amount of space available for additional fruit is reduced so that it becomes harder to satisfy packaging constraints;

moving picked fruits from punnet to punnet is undesirable because it is time consuming and may damage the fruit the size and quality of yet-to-be-picked fruits is generally not known a priori; and there are time constraints on how soon punnets containing picked fruit must be removed from the field for possible refrigeration and onward distribution.

In a simple application of the above idea, each successive picked fruit might be placed in one of several available punnets to maximize incremental cost decrease according to the cost metric described earlier. However, this greedy local optimization approach will not produce a globally optimal distribution of fruit. A more sophisticated embodiment works by optimizing over the expected future cost of the stream of yet-to-be-packaged berries. While it may not be possible to predict the exact size or quality of yet-to-be-picked berries, it is possible to model statistical distributions over these properties and these distributions can inform more optimal placement of each successive picked fruit.

Carousel for Improved Distribution of Berries Among Punnets

The use of a carousel motivates several consequential features that facilitate more optimal placement of berries among punnets compared to the approach described above. An important insight is that the carousel allows the properties of multiple berries to be measured (at the point of picking or inspection) before committing to deposit the fruit into any specific punnet. This means that picking and packaging responsibilities of the system can be decoupled. The picking arm can continue picking onto the carousel (at least until the carousel is full). Meanwhile the packaging system can deposit berries from the carousel into a punnet.

This means that better distribution of fruit placement can be achieved. For example, each fruit can be placed to minimize total cost given (i) the known existing placement of strawberries in punnets, (ii) the known properties of the yet-to-be-packaged berries on the carousel, and (iii) expectation over many samples of future streams of yet-to-be-picked strawberries. A probability distribution (Gaussian, histogram, etc.) describing the size of picked fruits and possibly other quality measures can be updated dynamically as fruit is picked. The benefit of using a carousel or magazine to store picked fruit before it is placed into punnets is that the picking robot has more perfect knowledge of the attributes of the fruit stored in the carousel than it does of yet-to-be-picked fruit.

In a packaging system designed to optimize the placement of berries amongst multiple punnets, it is generally advantageous to have more punnets available for berries, at least until the point where there are so many punnets that they cannot all be filled quickly enough. The reason is that there are more ways of satisfying the constraints—in the same way that it is easier to solve a jigsaw puzzle if some of the pieces are identical. Therefore, in systems with multiple picking arms, a valuable feature is the idea of a carousel that permits berries picked by any arm to be placed in any not-yet-full punnet. The obvious benefit is that more picking arms share more available punnets. This can facilitate more optimal placement of berries amongst punnets because there are more ways of placing each berry.

An additional benefit of using a carousel or magazine is the possibility of storing additional picked fruit even when the last available punnet is full. If a human operator or another robot is required to unload the trays of picked fruit, this means that the robot can keep picking for longer whilst waiting for full trays to be unloaded, allowing greater utilisation.

Hand-Off

Figure 7:
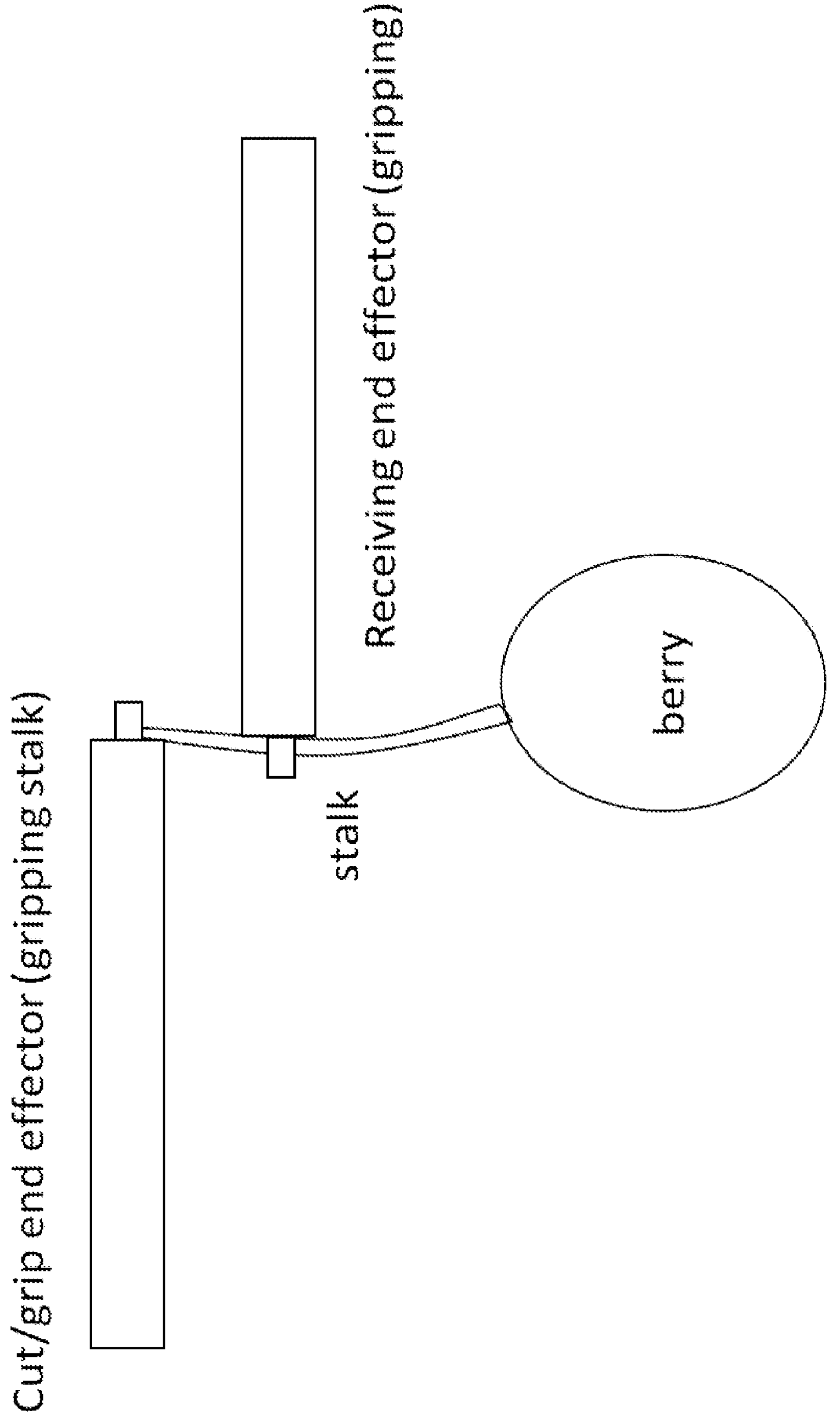
FIG. 7 shows an illustration of a step of the hand-off approach.
Figure 8:
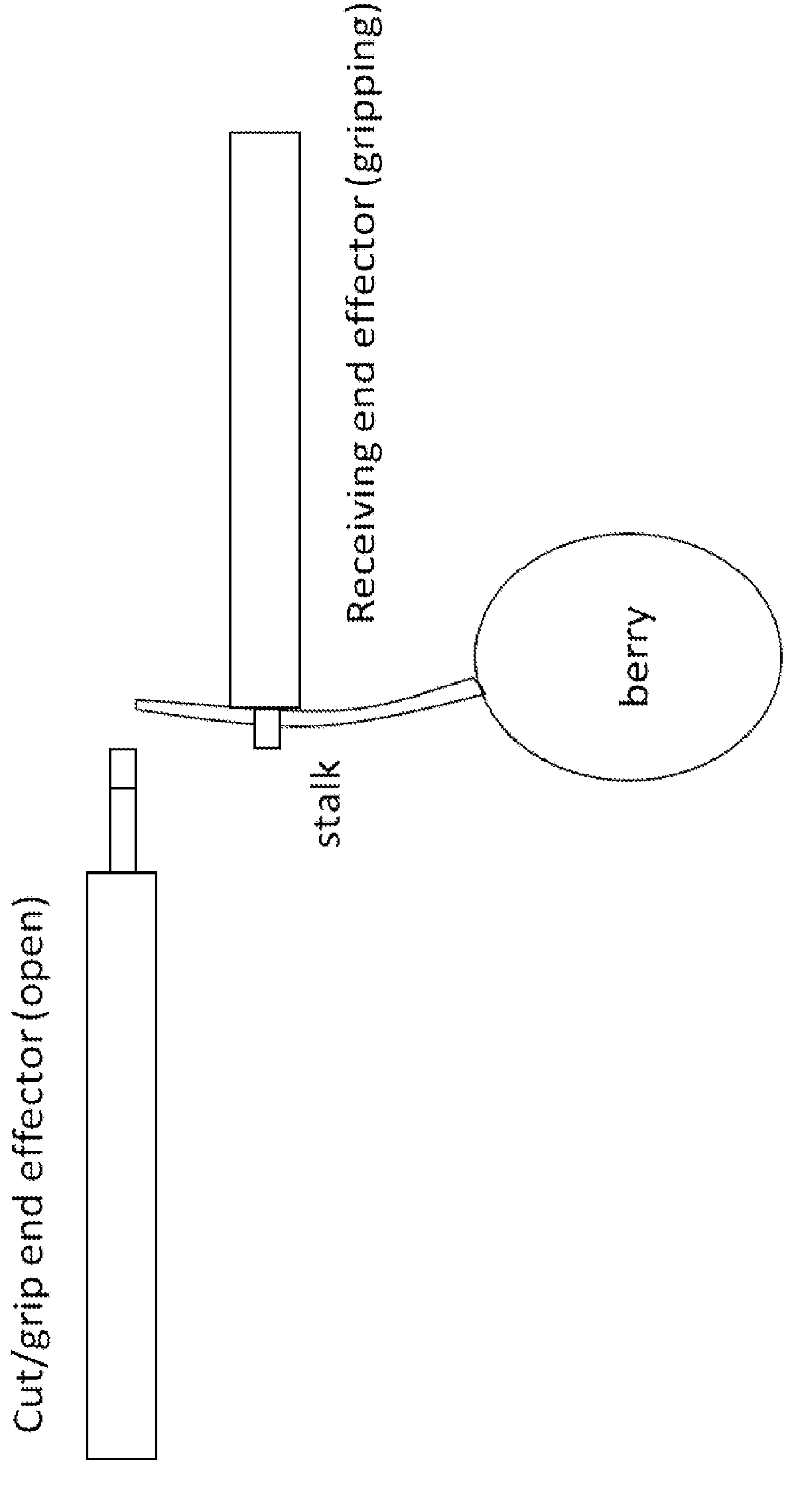
FIG. 8 shows an illustration of a step of the hand-off approach.

In practical embodiments of a scheme to store picked berries in a buffer before transferring them permanently to punnets, it may be necessary to solve the general problem of allowing a berry to be handed off from the picking arm's end effector to some other holder. If the end effector grips the picked fruit by the stalk, then one possibility is to hand off the stalk from one stalk holding device to another. A possible embodiment of this idea is illustrated in FIGS. 6 to 8.

Figure 6:
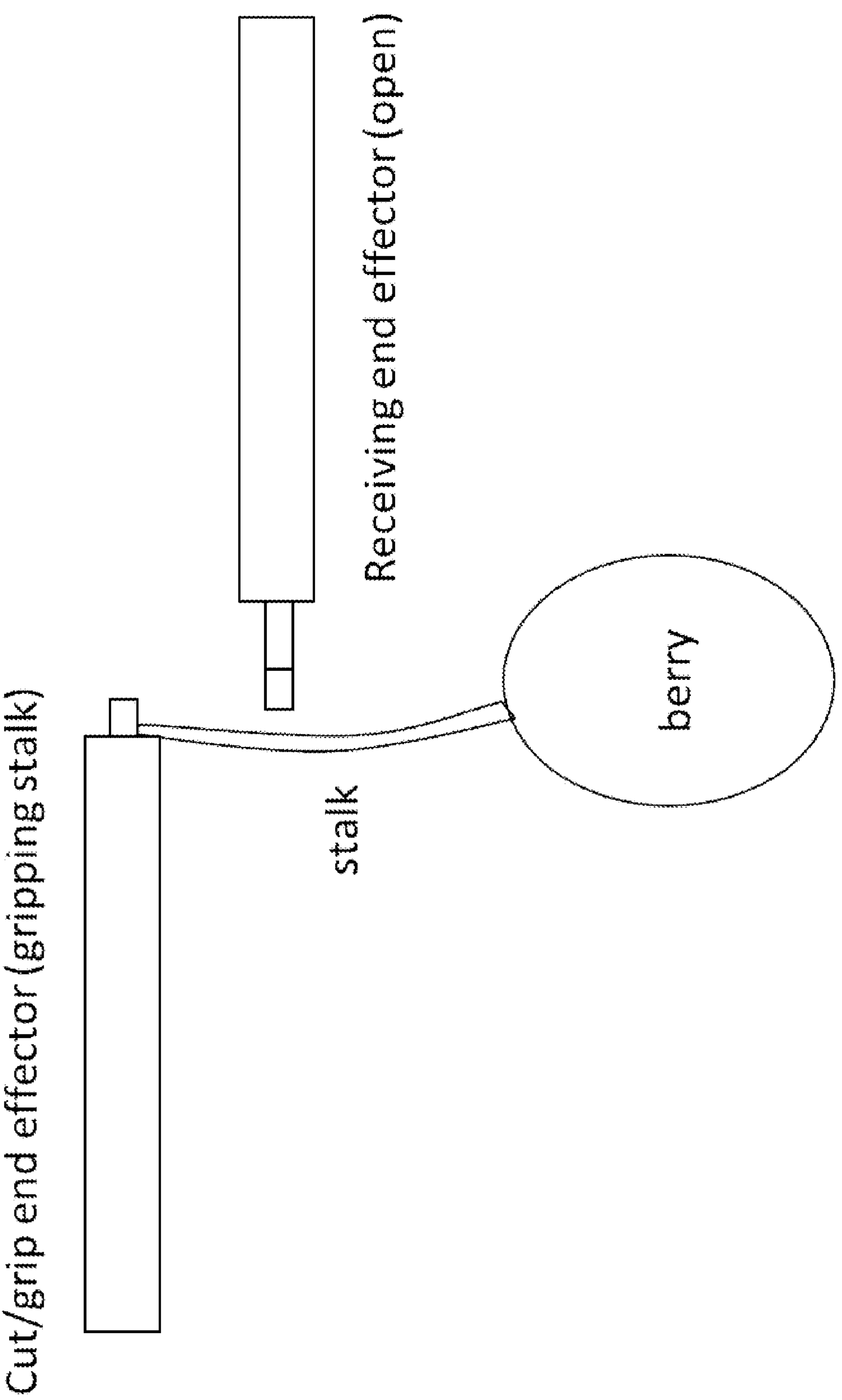
FIG. 6 shows an illustration of a step of the hand-off approach.

As shown in FIG. 6, the picking end effector grasps the berry by the stalk; a receiving end effector is open. As shown in FIG. 7, the receiving end effector then closes on the stalk (and might, optionally, cut the stalk above the point at which it is gripped to reduce the length of stalk). The picking end effector releases the stalk, as illustrated in FIG. 8.

For this approach to be successful, it is necessary to ensure that a sufficient length of stalk is available for the hand off to be successful. However, a useful feature is to make the receiving holder capable of cutting as well as gripping the stalk (in the same manner as some picking end effectors). This allows the berry to be picked with a stalk of greater length than is required and then any excess stalk to be trimmed at the point of handover. Another important benefit of this approach is the possibility of adapting stalk lengths to meet retailer requirements (typically supermarket retailers require berries to have stalk length within some bounds, e.g. 8 to 15 mm for strawberries).

Another way of achieving handoff is to use portable holders (or pallets) that grip the fruit (or its stem) and are themselves transferred during the handoff. The advantage is improved reliability because of the predictable geometry of the pallets. The pallets may be disposable or reusable. The picking arm could collect the next pallet at a tool change station, or pallets (whether holding a fruit or empty) could be transported along the picking arm towards the end effector, e.g. via the same carousel used to transport fruit away from the end effector.

Using pallets creates the risk of contaminating punnets of the picked fruit by dropping a pallet into a punnet due to failure. A solution to this problem is to give each pallet a machine-readable unique ID, e.g. bar code or RFID tag. By this means it is possible for the picking robot to verify that all pallets are present and e.g. issue a warning and stop picking if they are not.

Various other means of handing off a picked berry to a carousel are possible. One possibility is to use a carousel in the form of a cable or belt with clips at intervals and some means of opening and closing the clips, e.g. by the action of a spring or electromagnet or solenoid. Another possibility is to use a pair of belts in contact with one another, arranged so the stalk of a berry can be trapped between the outer surface of one belt and the inner surface of the other. Then the berry can be released by locally separating the belts so that they can no longer grip the stalk, e.g. by inserting a suitable separator between them. Other possibilities include (i) a laterally asymmetric chain that can grip the fruit between the links when wound clockwise but will release the fruit if wound anticlockwise, and (ii) an elastic element (such as an elastic band) that holds the berry or stalk when under tension but releases it when the tension is decreased.

Safe operation of robot arms often necessitates the use of guards to prevent people entering the working volume of the arms. This motivates another interesting feature, which is to use a carousel to carry picked berries from inside the volume of space protected by the guard to a punnet (or other storage facility) located outside the guard. This may considerably facilitate unloading and loading of punnets of picked fruit or trays of punnets etc. (e.g. by an operator or automatic loading/unloading system), since these can now be stored outside the primary guard. The carousel itself should ideally be sufficiently unlikely to cause harm to nearby people that it does not need a guard. Otherwise it might use a simpler smaller guard due to its small working volume.

Post Processing of Picked Fruit

Using a hand off system allows the dissociation of fruit picking and post processing tasks. Examples of post processing tasks are inspection (e.g. for quality control), stalk removal (or reducing stalk length), separating berry fruits (like raspberries) from their receptacles, or separating individual fruits from picked bunches. Again, it may be beneficial to devote separate hardware to these post processing tasks to allow the relatively more expensive picking arm to devote a larger proportion of its time to picking.

The handoff system can receive a picked fruit and carry it to an inspection system for quality control. It may be desirable in general for an inspection system to allow a picked fruit to be imaged from multiple relative viewpoints. A carousel may facilitate multi-viewpoint imaging because a picked fruit can be carried along a path that brings it into view of one or more cameras with appropriate camera-relative pose. Another possible feature would be the use of a convoluted path to prevent external light sources from interfering with the correct operation of the inspection cameras. In this context, cameras should be taken to include any device that makes a possibly viewpoint dependent measurement of a picked fruit.

In some scenarios, it may be desirable to pick multiple fruits simultaneously, either by cutting and gripping a shared stalk or by cutting and gripping multiple stalks at once. In these scenarios, it may also be desirable to separate some or all of the fruits after picking, e.g. to separate out bad fruit from a bunch or to package fruits individually. This gives rise to the interesting feature that the multiple picked fruits can be handed off by a main picking arm for later separation.

Punnetization

A key function of a carousel system may be to deliver berries to punnets or other containers ('punnetization'). One approach works by allowing berries to be delivered from the carousel into punnets, e.g. by releasing or cutting the berry's stalk, or disassociating the body of the fruit from its receptacle. Then, by routing the carousel to (or above or past) all available punnets, a picked berry can be delivered to a specific target punnet by releasing it when it is at the appropriate position relative to that target punnet, e.g. by dropping it when it is above the target punnet or dropping it on a chute that leads to that punnet. It may be valuable to limit the number or range of locations at which berries can be released by having punnets themselves move to a designated delivery location or designated delivery locations.

Section 3. Controlling a Robot Team

Collaborative robots are employed today in a wide variety of applications. Collaborative robots are often required to work in groups, each performing a specific task for a brief period of time, to obtain a desired common result. Collaborative robots within these groups may be required to move between tasks and must be reprogrammed in each instance. For example, fruit picking robots may be arranged to work in groups, each robot assigned to a particular area to gather fruit. The distribution of available fruit or the development of a fault with one or more collaborative robots may require the collaborative robots team to be reorganised midway through a picking session to optimise the fruit harvested and the distribution of picking capacity. Such robot team reorganisation requires the robots to be reprogrammed quickly to maintain optimum task performance.

A current problem with reorganising collaborative robots is the complexity and time required to configure the collaborative robot to act in a new group or perform a new task.

Typically, when working in a collaborative group the robots are connected by a communication network such as a WiFi or cellular network. This allows each robot to act independently but also collaborate with each other in achieving a common goal. Where different teams of robots are working within the same geographical area, multiple communication networks may be required to avoid bandwidth issues degrading robot performance and to allow for the greater safety of human operators.

It is common for groups of mobile robots who are active around human operators to use wireless emergency stop systems or e-stops. E-stops are designed to provide personnel working in a dangerous area with a means of stopping a robot in an emergency. In an emergency that might escalate into a hazardous situation, an operator presses an e-stop button to halt the robot, preventing further risk to the worker or the system or other personnel in the vicinity. Typically, a wireless e-stop is configured to work with the granularity of a team-so that all robots in a team can be e-stopped simultaneously. The robot must be approached physically to allow a supervisor to access robot control, any e-stop safety mechanisms disengaged and the robot disconnected from the communication network before any updated information can be entered into robot. This is time consuming and impractical where an operator may be working alongside a large group of robots.

What is required is a system for grouping collaborative robots into one or more teams and switching collaborative robots between different robot teams in a way that is simultaneously convenient and safe.

The main difficulty is to group mobile robots into teams for control and communication purposes and to move robots between teams. An obvious solution would be to store some configuration data in the robot's memory describing the robot's team assignment. Then the robot could be assigned to a different team by changing the configuration data.

However, this approach has several limitations that may not be immediately apparent: robots designed to work in concert with human operators are not amenable to centralized control because control needs to be mediated via the human operator.

And consider the following three difficulties:

- Robots may be designed to be controlled via a wireless communication network with one or more access points (e.g. WiFi). However, if robots belonging to different teams need to use different access points, then reassigning a robot to a new team via a software (e.g. HTTP-based) UI exposed over the wireless communication network itself could easily, in the event of failure to connect to the new access point, leave the robot no longer connected to any access point and therefore no longer controllable.
- If teams of robots are associated with a wireless e-stop transmitter (a device capable of e-stopping all the robots in a team remotely) it may not be desirable to reassign robots between teams under software control. The reason is that it is exceptionally hard to make software provably safe.
- It may not be visually apparent to which team a robot belongs if robot-team association is defined purely by software state. In principle, robots might give some visual indication of this state, e.g. by showing a coloured light, but this would not work for a robot that is turned off.

A solution is provided that makes use of a physical key to achieve the association of robots into teams and to manage the different robots.

Providing a physical key that can be removed and inserted into the robot is advantageous for a number of reasons, including but not limited to the following:

The appeal of defining robot-team assignment via a physical key is that the physical key can be designed to give a clear visual indication of team assignment when inserted into the robot, e.g. by attaching it to a coloured flag.

There may be some practical limit to the number of robots that can be assigned to a team, e.g. because safety requirements dictate that a robot operator can only operate a maximum number of robots. The appeal of using physical keys for robot-team assignment is that this number is strictly enforced by the number of available keys. Furthermore, if robots are controlled by an operator with a tablet, there might similarly be a need to ensure there is only one tablet that can control the robots at one time.

Plugging a physical key into a robot makes it more obvious which communication network the robots should join. Furthermore, in the event that the robot fails to join the intended communication network, the robot's network association can be reconfigured by simply inserting a different key.

The physical key can be designed to achieve a particular association in between teams. For example, the physical key can define a wireless e-stop using simple electronics in order to meet safety requirements, such as using a simple hardcoded number in the key.

A specific key may be designed for a particular function, such as repair or maintenance purposes. When that specific key is plugged into the robot, it may be driven out of the field by a field technician.

There are a large number of use case applications for the proposed solution. As an example, a delivery van may include a number of autonomous robots that make the final leg of each delivery. When a driver arrives at a destination, the driver may then plug in a pre-configured physical key into one or more robots or team of robots, and then they unload off and move away from the van to complete their deliveries. The physical key may be pre-configured such that the robots only work with a particular delivery van.

Figure 9:
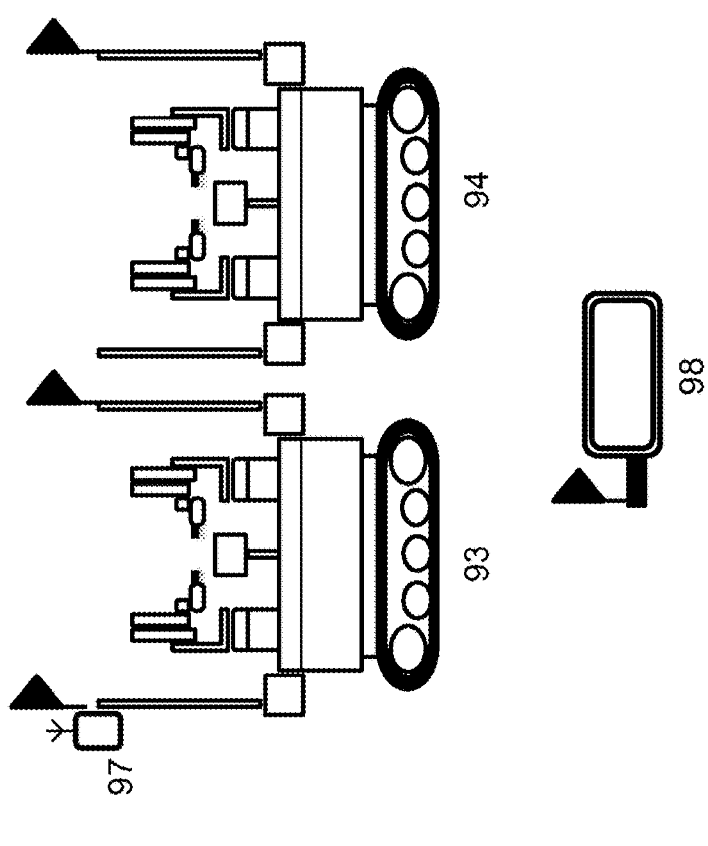
FIG. 9 shows an illustration of a method for controlling robotic teams.
Figure 9:
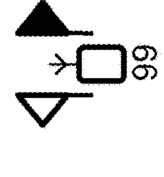
Figure 9:
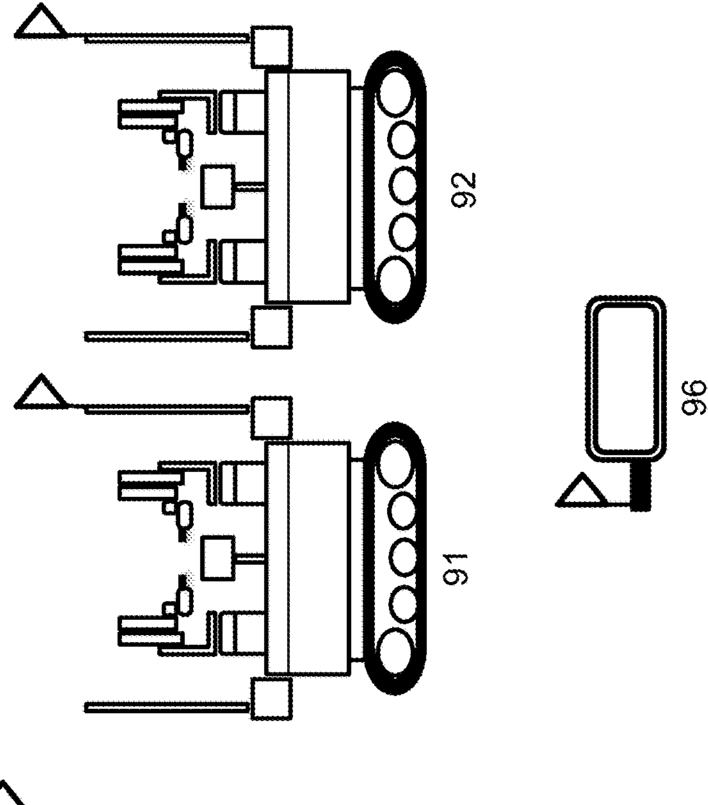

FIG. 9 shows an illustration in which four robots (91, 92, 93, 94) have been allocated into two teams. The first robotic team includes robots 91 and 92. The physical keys associated with the first robotic team each include a white flag. The physical keys associated with the first team are also linked to the same WiFi access point 95, and the same tablet 96. The second robotic team includes robots 93 and 94. The physical keys associated with the second robotic team each include a black flag. The physical keys associated with the first team are also linked to the same WiFi access point 97, and the same tablet 98.

Hence the two robotic teams operate with different infrastructure (WiFi and tablet) allowing for a safe and independent control of each robotic team.

Optionally, a dual WiFi access point 99 may be linked to or associated with both robotic teams.

The robots may be assigned into a collaborative relationship or into sub-groups by a supervisor. Typically the supervisor will be a human operator employed to manage the robot group, however the supervisor could be another robot.

We have used the term 'robots' in this text and it may be useful to define what we mean. A robot is a machine capable of basic decision-making capabilities which allow it to carry out a complex series of actions autonomously or with limited supervision. The robot may make use of artificial intelligence for making decisions or to adaptively learn from changing scenarios.

Typically, robots have a sensory system for detecting the environment about them and functioning effectively. For example, this sensory system is capable of complex visual detection through the use of high-speed video cameras, object proximity detection through use of lidar and touch sensors and position detection through the use of GPS, encoders and velocity sensors.

Preferably, the robots are capable of self-transportation, however they could be transported by another device or be stationary depending on the application. The robots may also be self-propelled by use of motorised tracks.

Robots typically have appendages or actuators to assist with the functions they are assigned. Preferably, these appendages include electromechanical or pneumatic arms and gripping implements or end effectors.

Typically, robots may include their own power source, however they may derive power from external sources. Robots make use of one or more computer processors, and may include memory for storage of data, software programs and an operating system.

Preferably, the robots are capable of communication with each other and the supervisor using wired or wireless technology, sound, visual stimuli or any other suitable communication method.

While appropriate to groups of robots, the features described in this section are applicable to any autonomous devices that are capable of being divided into groups from among members of a larger group. The robots can be arranged or grouped in any number of scenarios and may include homogenous and heterogeneous robot configurations—for example fruit picking robots and fruit carrying robots.

A specific collaborative robot scenario of strawberry picking is now described. The objective in collaborative fruit picking is to traverse a row of fruit plants from one end to another by a team of robots, which identify and retrieve pickable fruit. A human supervisor may be responsible for the safety (or other aspect of performance) of the robots in the group of robots.

An important step in collaboration is the arrangement of robots into teams to define and limit the set of robots being supervised by a particular human supervisor and to improve picking efficiency. To improve safety, allow for easier control by a human operator, avoid collisions and traffic jams, each team of robots is assigned a specific area to gather fruit.

Typically, each robot would be assigned to a single row, or part of a row, of fruit plants.

During the picking operation a robot may develop a fault and need to be rapidly replaced, or the arrangement of the robot teams might need to be adjusted to assign more robots to a given area based on changing local conditions.

To move a new robot into a picking team, a supervisor must disable any safety mechanisms and/or disengage them from any team-specific networks such as WiFi networks or e-stop networks, remove any unrequired robots from the team (such as a faulty robot), add the new robot to the robot team communication network and re-enable any team-specific networks and any safety mechanisms. This typically involves a number of complex steps and is time consuming and requires a degree of expertise. To maintain optimum picking efficiency, it is important that any remaining robots in a robot team do not stop working or collide with a malfunctioned stationary robot. In addition, strawberry picking robots operate in a confined space and a human operator is at risk of being injured by a moving robot when inside the picking area. Therefore, the operation to add and remove robots from a robot team must be prompt, requiring a limited number of steps and little expertise or skill on behalf of the supervisor.

We address these challenges by having a rapid and simple method of assigning robots to robot teams; this is achieved using a set of physical keys that are inserted into the robots, as described earlier. A particular set of physical keys may be associated with a specific robotic team.

Preferably, prior to beginning the picking operation each robot is unassigned to a team and optionally as a consequence of not being in an assigned team is in a dormant or low power sleep state. This provides safety to any human workers near the robot.

A supervisor has a number of physical keys or team identifying apparatus (TIA) corresponding to each robot required to pick fruit.

Preferably, each TIA comprises an information storage module (ISM) which allows a robot to self-determine its robot team allocation.

Preferably, the ISM comprises an RFID tag for providing identifier information and each of the robots have a corresponding RFID tag reader configured to read the RFID tag.

The supervisor locates the ISM in the vicinity of the robot's RFID tag reader permitting the robot to retrieve the identifier information. The robot accesses a list of predetermined robot teams from a team information database and automatically assigns itself to the correct robot team using the identifier information retrieved from the RFID tag.

The ISM may also comprise a barcode or other machine-readable medium configured to provide identifier information. The robot is configured to read the machine-readable medium by for example a barcode scanner or machine vision camera system and retrieve the identifier information. Following retrieval the robot automatically assigns itself to the correct robot team from a list of predetermined robot teams held on a team information database using the identifier information.

Preferably, the team information database is held locally within the ISM or memory of each robot. However, the team information database could be held remotely at a base station or server and the robot could access the team information database through a connected communication system such as WIFI or cellular network.

The ISM may comprise a solid-state storage device, card or drive such as a flash memory or RAM device or magnetic hard-drive which stores the team information database of predetermined robot teams and the identifier information. The robot can be configured to read the information held on the ISM through communication module or a wired or wireless connection. Examples of wireless connection include Bluetooth®, WiFi and other radiofrequency communications, acoustic communication or infrared communication. The ISM may contain the team information database of predetermined robot teams and the identifier information relating to the ISM. In this case, the robot either self-allocates or is allocated by the TIA to a selected robot team using the information contained in the ISM.

The ISM may comprise a barcode or other machine-readable medium configured to provide identifier information and the team information database of predetermined robot teams. Preferably, the medium is removable from the TIA (such as a removable barcode sticker) to allow the identifier information and the team information database to be replaced with updated information. The robot is then configured to read the machine-readable medium, identify a team using the identifier information and self-allocate to the correct robot team in the team information database.

To assist the supervisor in selecting the correct TIA, the TIA may be configured to be easily identifiable by the supervisor. For example, the TIAs for a first robot team may have a casing of a first colour, shape, texture or pattern different to the TIAs for a second robot team. Further the TIAs may have brail or other tactile markings for assisting visually impaired supervisors and/or during use in dark or low ambient light conditions. The TIA may have an indicator or sound output for providing identifier information to the supervisor.

Preferably a single TIA is removably attached to each robot to assist the supervisor in identifying robot teams; however, in an alternative application single TIA could be used to allocate multiple robots to multiple teams and not remain removably attached to each robot. The TIA may also be configured to allow the supervisor to select multiple identifier information for example through a user interface such as a button select.

The TIA may also be used to assign one or more predetermined robot work tasks to a robot or robot team allowing a robot or group of robots to be simultaneously assigned a robot team and a task or group of tasks within that robot team. Examples of the work tasks are observation tasks, picking tasks, pruning tasks and/or fruit retrieval tasks. Task information can be alternatively be stored with a team information database and retrieved by the robot using the identifier information stored by the ISM.

Preferably, each robot team operates within an independent communication network. This allows multiple robot teams to perform collaborate work within the same geographical area without wireless interference or loss of bandwidth issue. Examples of suitable networks include both wired and wireless networks, cellular networks and infrared networks. Preferably a TIA stores network information in the ISM and a robot is automatically allocated to a predetermined network when assigned to a robot team. When a robot is swapped to a different robot team by removing the first TIA and replacing with a second TIA the network is automatically updated and joined without need for supervisor assistance.

An additional benefit of one or more robots of a robot team operating within an independent communication network is the ability for the supervisor to control a specific team through use of a remote controller communicate coupled to the network without affecting other robot teams on other networks. The remote controller can be used to stop the current action of one or multiple robots on a network for example in an emergency situation. An example of a remote controller is an e-stop. The remote controller may be designed to accept a TIA or otherwise to allow the user to select the team from a suitability colour coded drop down menu or similar.

In an alternative arrangement the remote controller can stop one or more robots under predetermined conditions, for example if one or more of the robots exceeds a predetermined distance from a supervisor. In this arrangement the remote controller, TIA and/or robot both have positioning sensors such as GPS to determine the distance between them. Preferably the positioning sensors are mounted with the TIA and remote controller.

Typically, a strawberry fruit picking area consists of a polytunnel greenhouse containing multiple linear rows of fruit housed in raised beds. Current state-of-the-art fruit picking robots are capable of self-transportation and have a sensory system of visual detection, object proximity detection and positioning sensors, for detecting the environment about them and functioning effectively. Machine learning software is typically used to teach a robot's behaviour within a fruit row to follow a predetermined route (a work path) and enable it to travel to a fruit bush or tree, identify ripe fruit for picking and autonomously pick the fruit before moving on to the next bush or tree. However, such sensory systems are less effective in unknown environments, for example outside of the work path, where the robot has not been taught how to identify geographic features. In this scenario the robot's movement is unpredictable and potentially hazardous to human bystanders and farm equipment.

It is because of this reason that fruit picking robots are generally transported to a fruit picking area by human supervisors and manually driven to the start of each fruit row where upon they are activated into an autonomous mode and begin trundling down their allotted row, picking fruit. At the end of each row, each robot must be manually realigned to begin work again. This robot-row alignment process is time consuming and inefficient, especially where multiple robots must be manually aligned to each fruit picking row.

To solve this problem a further application of the TIA permits allotted robots or teams of robots to follow a predetermined work path. The work path information may consist of simple instructions or complex manoeuvres, for example: starting at the top of a first row of fruit, trundling down the first-row, picking fruit to the end of the row, and then aligning to the bottom of a second row of fruit and trundling up to the top end of the second row.

The ISM may store work path information which the robot can access and follow instructions from. Within the ISM the work path information is configured as multiple path objects that the robot must detect and pass through. These path objects could be visually identifiable waypoints such as farming landmarks, signs or beacons, electrically identifiable waypoints such as electrically conductive cables or beacons, acoustically identifiable waypoints such as sound emitting beacons or LIDAR or electromagnetically identifiable waypoints such as inductive loops, RFID tags or wireless beacons.

Preferably, the path objects comprise flat, arrow shaped markers of specific colours or patterns, preferably made of thin plastic or card. This feature provides a means of directing a robot or robot teams work path at low cost and without need for expensive installation of equipment at a fruit farm.

A robot determines which path objects it is searching for from the path information and uses its sensory system to detect path objects matching the path information. Upon detection the robot moves to the location of the path object. Preferably, the robot interprets the arrow configuration of the path object as the direction of movement necessary to locate the next path object. The robot then moves in this direction until its sensory system detects a subsequent path object and so on. This allows for path objects to be placed a greater distance than the robot's sensory system can reliably detect while still allowing the robot to trundle to the approximate location of the next path object.

The path information may comprise a predetermined number of path objects the robot must follow before stopping or performing some other task (for example picking fruit in a predetermined area around the path object).

Different robot teams may be assigned the same or different shaped, coloured or patterned path markers to enable multiple teams to operate simultaneously within a fruit picking area. Alternative shaped markers could further be used to instruct the robot to undertake different actions, for example a red cross shaped marker could be interpreted by the robot as a full motion stop while a green arrow might be interpreted as photograph but do not pick fruit in this area.

Alternatively, the markers might contain additional information beyond simple instructions. Such markers may comprise of a machine-readable medium such as, for example, a bar code or RFID tag.

Preferably the work path is stored with the ISM of the TIA and this allows a robot to be simultaneously assigned to a new robot team and corresponding new robot work path with little manual intervention by the supervisor on the fly.

Section 4. A Method of Determining the Ripeness of a Fruit

Before picking target fruits, it is beneficial to determine whether or not they are ripe. For some fruits like strawberries ripeness is strongly correlated with characteristics such as size and colour. However, for fruits like raspberries, another very useful predictor of ripeness is the mechanical properties of the physical attachment between the receptacle and the body of the fruit.

For illustration, human pickers may determine whether raspberries are ripe for picking by pulling gently on the body of the fruit to determine whether it can be easily separated from its receptacle-if it cannot be separated then it is not ripe. This gives rise to a useful feature, which is to use as a means of automatic ripeness determination measurements of the physical properties of the attachment between the receptacle and the fruit. Of particular interest is the elastic and plastic deformation of the attachment between the receptacle and the fruit caused by the application of force.

In principle, elastic and plastic deformation could be measured by gripping both the body of the fruit and the stalk and measuring the forces induced as they are moved (e.g. twisted or pulled) with respect to one another. However, a disadvantage of this approach is that touching the body of the fruit can cause bruising and cross contamination with disease pathogens.

Therefore a useful feature is to measure the forces induced by the inertia of the body of the fruit when a known (typically periodic) excitation force is applied only to the stalk. Suitable excitation can be applied by gripping and vibrating the stalk in a number of modes (e.g. by rotary motion about the axis of the stalk or otherwise, or reciprocating motion in any direction). The forces induced by the inertia of the body of the fruit may be measured by a strain gauge or similar.

For example, the elasticity of the attachment can be determined using the relative phase of the excitation force and the induced force and using an estimate of the mass of the body of the fruit. In the limit, the magnitude of the excitation force may be chosen to be sufficiently large that a fruit will become detached from the stalk if it is ripe. It may be desirable to limit the impact of the excitation force on other parts of the plant (and limit the impact of other parts of the plant on force measurement) by damping the induced motion further up the stalk (i.e. further away from the fruit), perhaps by means of another gripper.

Section 5. Storing System for Autonomous Machinery

A system for storing agricultural field equipment such as robotic fruit pickers is now described.

Typically, agricultural machinery is large, petrol driven and stored in sheds or other outbuildings. However agricultural robots are often small, typically use batteries which must be recharged each day from a main electricity supply, and require carefully controlled climates to avoid damage from long term storage.

A robot is often required to operate in different areas of a farm from day to day. To maintain safety on a farm the trundling speed of a robot is relatively slow. Where robots are stored in a central outbuilding this can result in significant loss of productivity due to transit time between the shed and the work area. Storing the robots close to the work areas significantly improves a robot's productivity by reducing unproductive transit time.

One solution might be to construct fixed outbuildings at each area of the farm, however this increases the overall investment and maintenance cost to the farmer. Further, where multiple robots are stored at multiple locations the work required by a human supervisor in maintaining and ensuring batteries are recharged increases significantly.

Further, shipping containers may currently store multiple robots. However, an operator typically has to drive each robot in turn out of the container. This is a very time-consuming process that increases when the operator has to drive each robot from the shipping container directly onto the field.

A system for maintaining, storing and transporting multiple robots, such as autonomous picking robots is provided. The system is configured to store the robots and charge the robots with minimal operator intervention.

Figure 10:
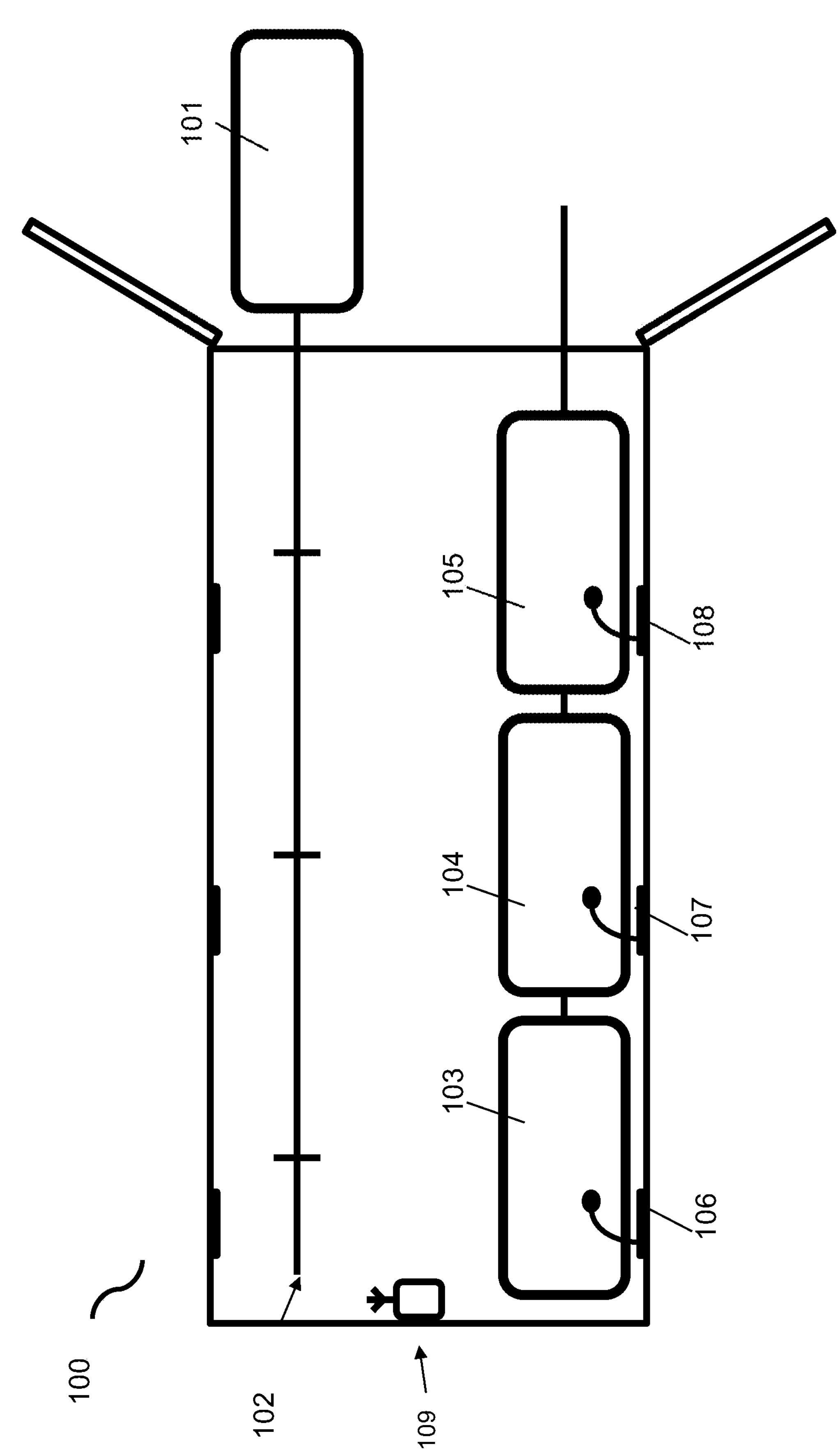
FIG. 10 shows a robot storage container.

FIG. 10 shows a robot transportation and storage container 100 that is configured to house multiple robots.

The robot 101 is configured to automatically load onto or unload from the container 100 and to follow the robot parking guide subsystem 102 in order to reach a charging or docking point.

Three robots 103 104 105 are shown at individual charging or docking points 106 107 108 that are configured to supply network and power to the individual robots.

The container can house multiple robots so that multiple robots (e.g. a team of robots) can be transported easily as a single entity.

The container contains some means of securing the robots so that the container can be safely transported by train, lorry or container ship. The means of securing robots may be as simple as tie down points—but it is clearly desirable that little preparation is required to make the robots ready to use once their container is delivered to a site.

The container is already instrumented with the infrastructure required to support robots in use-including charging points and network connections.

In principle, robots might be loaded onto a container or unloaded from a container one at a time under the control of a human operator. However, this is typically very time-consuming if the ratio of robots to human operators is high, particularly because these operations must typically be carried out at the start and end of each day's picking. Thus, a useful feature is to design the container to allow robots to drive into and out of it automatically. This might be achieved e.g. using visually identifiable targets in known positions or RFID transponders in known positions or an electrical cable following system or a rope following system.

The container may include a door for gaining access to the inside of the container.

Preferably the door can be secured and forms a substantially water tight seal with the container when closed. Preferably the door is configured with an electromechanical closing mechanism and can self-close under the direction of the robots or, alternatively, a controller mounted within the housing configured to detect the position of the robots and control the action of the door.

Preferably, the housing exterior of the container is configured to allow a fork lift vertical lifting plate to access the underside of the housing to allow transport by the fork lift thereof.

The container may include one or more of the following: electrical power outlets, a climate control subsystem and a communication subsystem.

The power outlets provide interfaces that supply energy to the battery of each robot. The outlets may couple the energy conductively or inductively.

The outlets may include a plug that is inserted into a compatible receptacle of the robots. Typically, a human supervisor may manually insert the outlet plug into the receptacle of each robot. It is preferable that the system can reduce the number of operations performed by the human supervisor and the container may further comprise an auto coupling apparatus to autonomously connect the electrical power outlet to the robots.

The climate control subsystem is configured to maintain optimal environmental conditions for the robot within the inner chamber of the container. The climate control subsystem may further comprise climate control subsystems (e.g. heating, ventilating and air conditioning systems, referred to herein generally as "HVAC"). Preferably thermostats are used to control when the HVAC system turns on and off.

A communication subsystem may connect each robot to a communications network so that the status of the robot and the container can be monitored remotely by the human supervisor. The status could include the robot's remaining battery power level, temperature, location or any other system specific parameters a human supervisor may require. Preferably the communication apparatus comprises a wireless or cellular network device, but alternative wired configurations could be used. Preferably the robot can communicate through the communication subsystem to a central communication subsystem or GUI that can be monitored by the human supervisor.

The internal chamber may further comprise navigational waypoints that are readable by the robots; the navigational waypoints are configured to provide navigational instructions to the robot to direct the robot into the internal chamber. Preferably the marking comprises surface printed machine-readable signs which can be interpreted by a robot's computer vision system, however the markings could comprise electromagnetic waypoints, for example an induction loop or RFID tags or a conductive connection. The waypoints may be arranged to direct the robot into the inner chamber and stop at a predetermined position to allow the robot to couple to the electrical power outlet and for the housing door to be closed.

The container may include a mobile chassis that generally comprises a base mounted upon a transit system. The transit system might comprise two or more wheel or tracks to allow mobility. To remove the need for the human operator to position the system, the chassis further comprises a tow bar or other mechanical coupling to allow attachment to a robot. In operation, a robot can be driven or can self-drive to its desired location.

Section 6. Lean Compensation Subsystem

Generally, the systems and methods described could be applied to any situation where a robotic arm is required to locate and pick an item e.g. litter picking. It particularly relates to autonomous robots working in a natural or less structured environment, such as in sloping or uneven terrain.

Power for robotic systems is commonly provided by heavy duty batteries stored within the chassis of the robot.

Typically, movement over the ground is achieved using powered wheels or tracks to reduce the need for additional infrastructure that might be required by using rails for instance and to provide the greatest degree of freedom to the picking robot. Typically, a mobile robot may incorporate a chassis with elastic suspension to allow movement over undulating terrain and to help improve robot stability.

In operation, a robot control subsystem might move a whole robot and the picking head and camera in an alternating sequence of two or more phases. In the first phase, an arm records image positions of detected fruits and in a subsequent phase, the picking head and camera move to a position near each prospective target fruit and picking takes place. Where two or more picking arms are present, each arm can be in the same or different phase depending on the relative picking speed of each arm.

Fruit is commonly grown on terrain that has adverse ground conditions and is rarely flat or level. Strawberries, for instance, are typically grown from rows of high tables which sit within polytunnel structures. While the levels of the tables may remain reasonably level, the ground underneath can undulate significantly in all directions. This presents a problem to an autonomous picking robot that must trundle along the row picking fruit because the robot's orientation can change such that the picking arms reach becomes limited, which in turn limits the amount of fruit that can be observed and picked. In addition, a robot extending its fruit picking arm may become unstable on uneven ground, resulting in a serious hazard to nearby personnel and equipment.

Typically, in order to improve image capture quality a robot arm would need to dramatically reduce or possibly even stop the picking speed of at least one arm while imaging is occurring. This however reduces the overall harvestable amount of fruit a robot can provide within a picking period.

The nature of adverse agricultural terrain typically results in mobile autonomous fruit picking robots employing tracks to help manoeuvre the robot over difficult terrain and to provide greater stability when engaged in fruit picking. However, often the fruit picking area is a considerable distance from an area where robots are initially deployed (such as by a road side) or stored (such as an equipment shed or barn) or between fruit picking areas. Tracked vehicles are generally slow in comparison to wheeled vehicles and considerable time can be spent moving a mobile autonomous fruit picking robot from one location to another, which reduces the overall harvestable amount of fruit a robot can provide within a specific working time.

Additionally, fruit picking robots must operate in a very narrow 'corridor' between adjacent crop rows. The sides of this corridor may be defined by the plants themselves (in the case of tall plants like raspberries or apple trees) or the infrastructure used to support them (e.g. the tabletop systems used to support strawberries or the metal and rope trellis systems used to support the trusses of raspberries).

The difficulty is what happens when the terrain is sloping or uneven; the robot may be canted to one side and is therefore unable to travel along the row without collision with crops or infrastructure, or use its picking arms efficiently because they are no longer optimally positioned with respect to the available working volume, which is generally vertical.

This problem is solved by the feature of dynamically adjusting the shape of an agricultural robot so that it better fits down the crop row along which it must travel.

It would also be advantageous for example to have a mobility means that allows for a mobile autonomous fruit picking robot to use slow stable tracks when picking and fast agile wheels when moving between locations.

We implement the feature of an improved suspension and counterbalance system that operates during the robot picking operation to improve the stability of the robot on adverse terrain and allow for rapid movement of the robot over less adverse terrain so as to optimise the overall harvestable amount of fruit a robot can provide within a picking period.

The shape of the robot might be adapted either to allow it to pass more easily along the row (perhaps avoiding specific obstacles), or to allow it to use its picking arms more efficiently.

The robot's shape might be adapted continuously as it moves along the row or only when it stops moving.

The robot might map the topography of the uneven terrain it traverses; this topographic map can be used by the robot to adjust the robot shape in anticipation of the uneven terrain, instead of reacting to it, enabling faster progress.

As an example, a fruit picking robot may include a lean (and/or roll) compensation subsystem such that the shape of the robot is adapted and compensates for non perfect terrain and alignment or through rows that have uneven crops or infrastructures. This is illustrated in FIGS. 11 to 17.

The fruit picking robot may include at least one picking arm and at least one picking head, or other type of end effector, mounted on each picking arm and a lean compensation subsystem adapted to compensate for uneven terrain to ensure that the picking arm and at least one picking head remain optimally positioned in respect of the fruit to be picked, the rows of fruit and the related infrastructure; the lean compensation system can provide improved suspension and a counterbalance (to prevent the robot from tipping over) during the robot picking operation or during the navigation of the robot.

Figures 11, 12, 13:
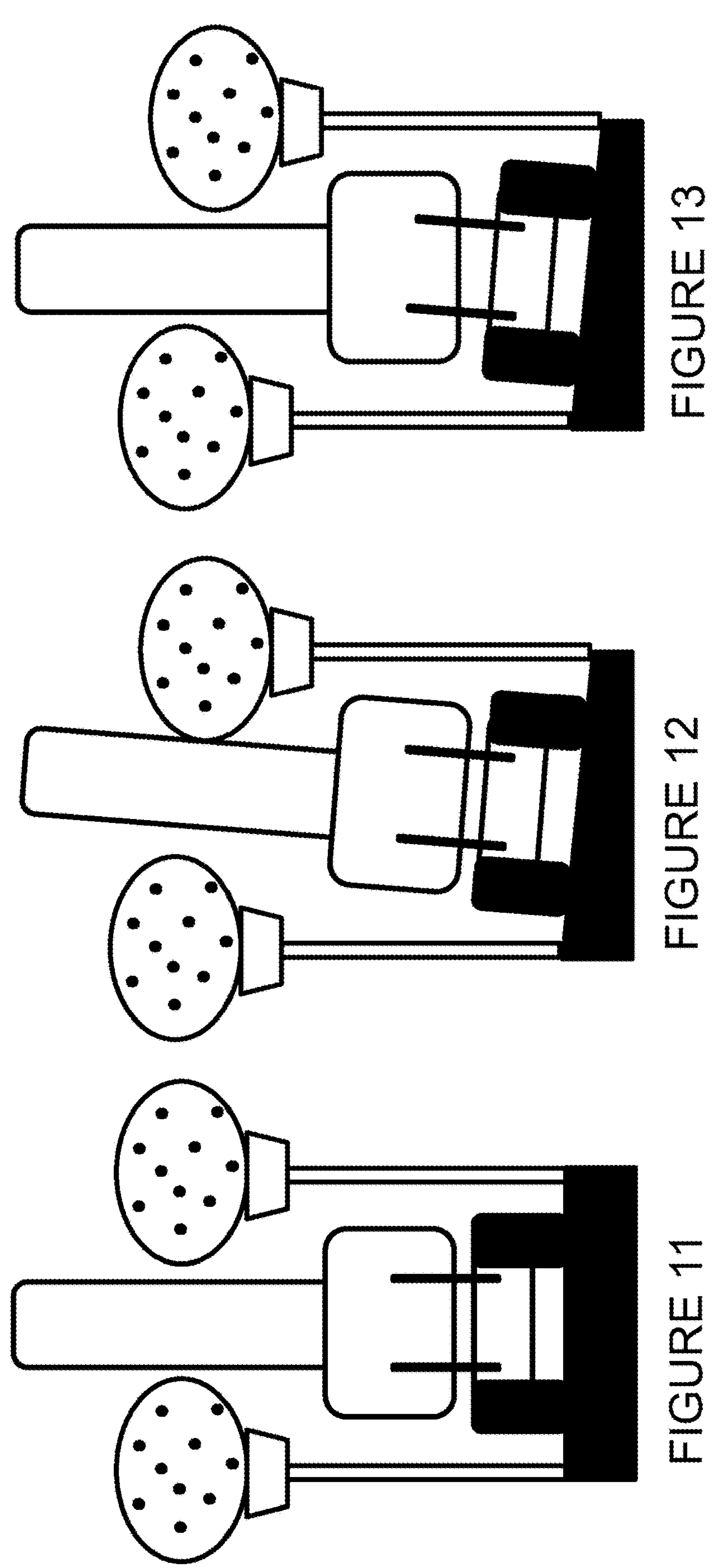
FIG. 11 shows a robot on flat ground running between rows of plants.
FIG. 12 shows a robot on uneven ground running between rows of plants without using a lean compensation subsystem.
FIG. 13 shows a robot on uneven ground running between rows of plants with the use of a lean compensation subsystem.

FIG. 11 shows a robot on flat ground running between rows. FIG. 12 shows a robot on uneven ground running between rows without using a lean compensation subsystem. The robot guard or robot arms hit the plants and infrastructure. As a comparison, FIG. 13 shows a robot on uneven ground running between rows with the use of a lean compensation subsystem. As seen, the shape of the robot is compensated and the robot guard and robot arms are aligned such that the robot guard or arms do not hit the plants and infrastructure.

For robots with a suspended chassis, an important feature works by varying, compressing or altering the length and/or compliance of the robot's own suspension. For example, in the case of steel suspension springs, this might be achieved by compressing the springs using a winch. In the case of air suspension, adding or removing air might achieve this.

Figure 15:
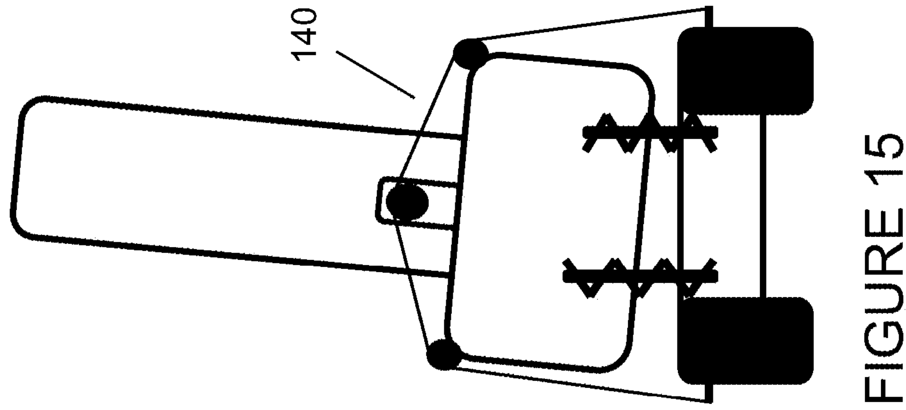
FIG. 15 shows a robot, including a suspension system and a winch, in a lean mode.
Figure 14:
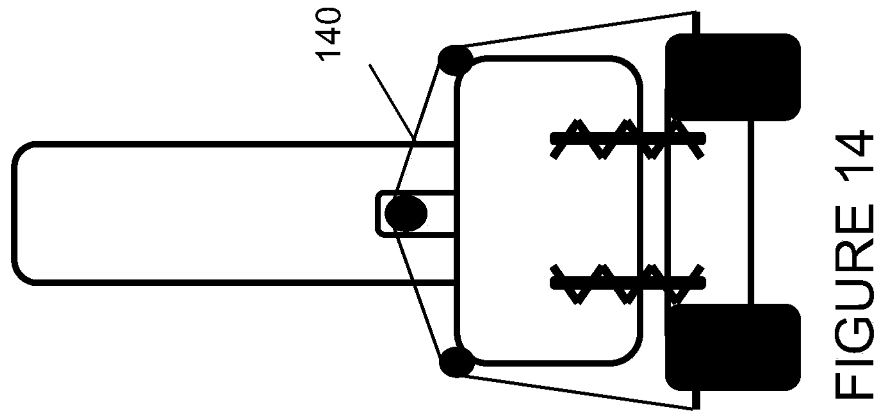
FIG. 14 shows a robot, including a suspension system and a winch, in a level mode.

FIGS. 14 and 15 show examples of a robot including suspension system, and in which a winch 140 is used to preload the suspension system. The shape of the robot may for example be changed to go between a level mode (FIG. 14) and a leaning mode (FIG. 15).

Figure 17:
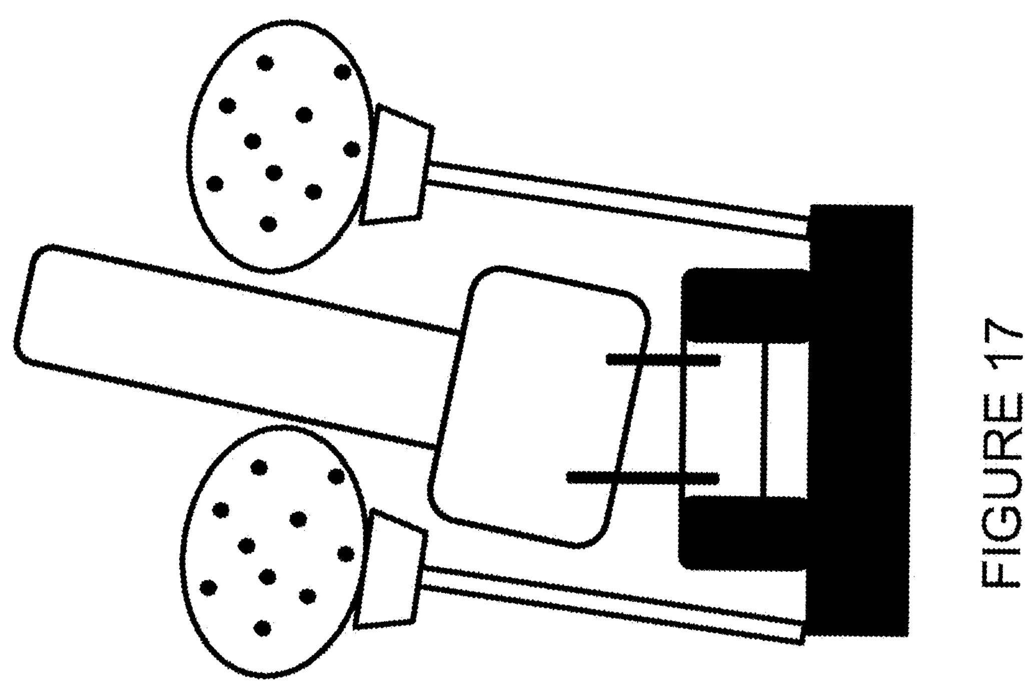
FIG. 17 shows a robot running on even ground between tilted plants or uneven infrastructure and using a lean compensation subsystem.
Figure 16:
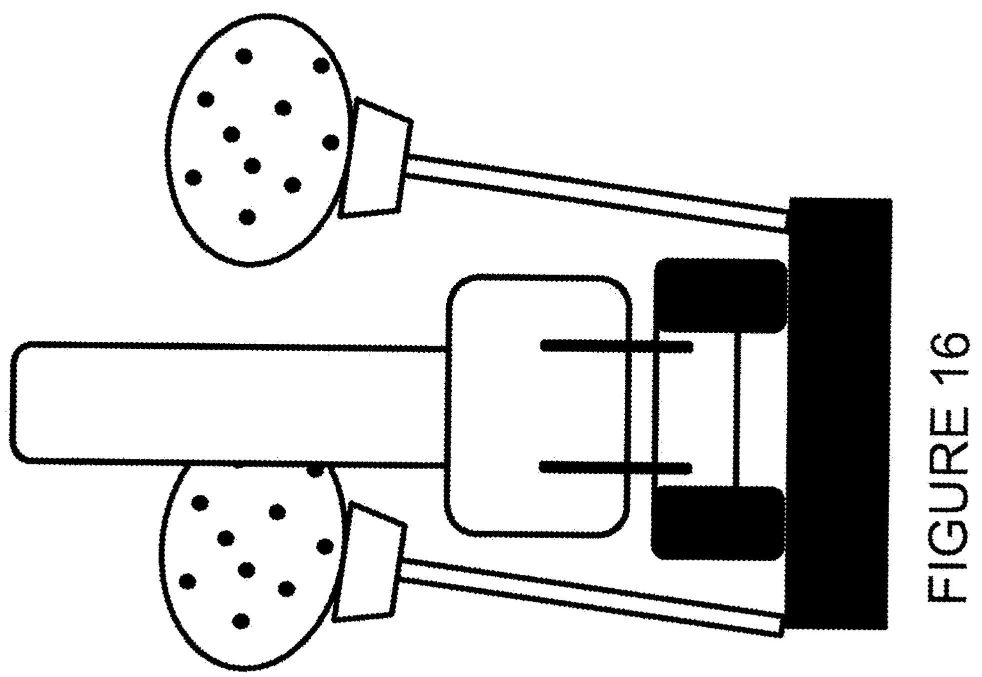
FIG. 16 shows an example of a robot running on even ground between tilted plants or uneven infrastructure.

FIG. 16 shows an example of a robot running on even ground between uneven infrastructures, resulting with the robot guards or arms hitting the plants and infrastructure. FIG. 17 shows the same robot using a lean compensation subsystem and in which the shape of the robot has been adapted to align the robot guard so as not to hit the plants and infrastructures.

The robot may comprise a mobile chassis having a base frame and a lean compensation subsystem comprising a movable counterweight slidably or rotatably coupled to the base frame and configured to facilitate simultaneous and independent counterbalancing of the centre of mass of the mobile chassis about an axis by adjusting the position of the movable counterweight relative to the mobile chassis in a direction substantially opposite to the axis of the mobile chassis.

The lean compensation subsystem may be electromechanically operated and comprise one or more springs intercoupled between the counterweight and the base frame. Inclination sensors such as accelerometers or visual sensors may provide feedback concerning the mobile chassis orientation to a control processor which determines a suitable position of the counterweight to maintain optimum centre of mass for the mobile chassis. Adjustment of the counterweight may be achieved by actuating a motor coupled to the spring by a tensioning element or by other movement means such as one or more rack or pinion mechanisms.

The counterweight preferably comprises one or more weights selected to counterbalance the weight of the mobile chassis. Preferably the counterbalance additionally includes heavy component items of the robot such as batteries or fruit picking containers to reduce the overall total weight and manufacturing cost of the robot chassis.

Additionally, a method of improving image capture quality in a multiple armed fruit picking robot by determining the impact of the motion of a second arm on the pose of a first arm in order to adjust the pose of the first arm to compensate for the motion of the second arm may also be provided.

This could be achieved predictively, using physics simulation to predict the impact of the motion of one arm on the position of another using an appropriate predetermined physical model of the arms and the elastic properties of the suspension or through measurement, e.g. by using an accelerometer or similar to measure the chassis lean induced by arm motion.

Another feature provides a method of improving image capture quality in a multiple armed fruit picking robot by dynamically limiting the motion effect on a first arm by a subsequent arm movement on the pose of a first arm by reducing the acceleration or velocity or reach of the other arm.

The acceleration or velocity or reach of the other arm might usefully be reduced to an extent that depends on the degree to which coupled motion is undesirable. For example, the other arm might be made to slow down when the first arm is performing precise vision-guided pose adjustment during a delicate picking movement.

Another feature provides a method of improving image capture quality in a multiple armed fruit picking robot by capturing an image with a first arm while using a subsequent arm to counterbalance. This could be achieved by using the feedback from an accelerometer to drive the subsequent picking arm head in opposite direction.

Another feature provides a method of improving image capture quality in a multiple armed fruit picking robot by using a first robot arm to rotate and pan its image acquiring camera in sympathy with robot motion when obtaining images from the moving robot to minimise motion blur.

Another feature describes a robotic fruit picking system that comprises a tracked vehicle capable of autonomously engaging a wheeled drive system. The robot system comprises a robot chassis coupled to a drive motor, a drive selector mechanism, a track drive unit and a retractable wheeled drive unit.

The track drive unit comprises two or more tracks mounted on a track chassis and mechanically coupled to the drive motor.

The wheeled drive comprises at least three wheels mounted on one or more-wheel chassis units and mechanically coupled to the drive motor. The wheel chassis unit is coupled to the robot chassis and configured so as to be retractable within the robot chassis to an extent the lowest edge of the wheels when retracted are above the highest level of the tracks. When extended, the wheel chassis is configured so that the lowest edge of the wheels are below the lowest level of the tracks.

The drive selector mechanism is configured so as to control the retractation of the wheeled drive unit and comprises a drive selector mechanism controller and a retraction gear coupled to the wheeled drive unit and the drive motor. When engaged by the drive selector mechanism controller the retraction gear mechanically couples with the drive motor to engage the retraction gear and extend the wheeled drive unit downwards. In operation, when engaged the wheeled drive unit extends below the tracked drive unit raising the tracked drive unit from the floor and disengaging its ability to propel the robot chassis.

The drive selector mechanism controller may be further controlled by, or be incorporated within, the robots operating hardware.

APPENDIX A: FEATURES SUMMARY

This section summarises the most important high-level features; an implementation of the invention may include one or more of these high-level features, or any combination of any of these. Note that each feature is therefore potentially a stand-alone invention and may be combined with any one or more other feature or features; the actual invention defined in this particular specification is however defined by the appended claims.

There is inevitably a degree of overlap between these features. This approach to organising the features is therefore not meant to be a rigid demarcation, but merely a general high level guide.

The high level features are organized into the following categories:

- Section 1. A fruit picking end effector
- Section 2. Carousel for the inspection and packaging of picked fruit
- Section 3. Controlling a robot team
- Section 4. Determining the ripeness of a fruit
- Section 5. Storing system for multiple robots
- Section 6. Lean compensation subsystem

Section 1. A Fruit-Picking End Effector

Feature A: End Effector Includes an Aperture that can be Changed Dynamically A robot fruit picking system comprising an autonomous robot, the robot fruit picking system including an end effector mounted on a picking arm or other end effector positioning device, in which the picking arm is configured to position the end effector;

and in which the end effector includes an aperture that can be changed dynamically by driving a single actuator in order to either grip, cut or release a fruit or a stalk or stem of a fruit or bunch of fruits.

Optional Features

- aperture is changed dynamically in order to increase the probability of picking success of a target fruit or bunch of fruits.
- probability of picking success for a target fruit is estimated by taking account one or more of the following: obstacles near a fruit or stalk or stem of interest, position of target fruit or stalk or stem, environmental conditions such as wind or motion of the picking arm.
- gripping, cutting, or releasing actions of the end effector are performed without having to move the picking arm.

End Effector Comprises a Set of Jaws and a Cutter Assembly

- end effector comprises a set of jaws and a cutter assembly that slides along the set of jaws.

aperture of the set of jaws is configured to change based on the sliding action of the cutter assembly along the set of jaws.

the set of jaws is configured to normally spring open.

picking arm is configured to position the set of jaws on either side of a fruit or stalk or stem of a fruit or a bunch of fruits to be picked.

cutter assembly includes a cutting blade.

cutter assembly is driven off a single actuator or motor.

cutter assembly is configured to be pushed or moved forward in order to close or squeeze together the set of jaws and pull the stalk or stem into the cutting blade.

set of jaws is configured to grip the fruit or stalk or stem of the fruit or bunch of fruits.

jaws are barbed jaws.

cutter assembly is configured to be pushed or moved backward in order to release the picked fruit or bunch of fruits.

aperture of the set of jaws can be selected such that the set of jaws can be configured to be only partially closed around a fruit or stalk or stem so as to encircle the fruit or stalk or stem without applying significant force or cutting to the fruit or stalk or stem.

Computer Vision Subsystem robot fruit picking system includes a computer vision subsystem to analyse images of fruit to be picked.

computer vision subsystem includes a stereo camera.

3D position of the end effector is inferred from 2D images.

end effector includes fiducial markers.

3D position of the end effector is used to update the positioning of the picking arm and/or the positioning of the end effector with respect to a fruit or stalk or stem of a target fruit or bunch of fruits.

position of the cutter assembly with respect to the 3D position of the end effector is used to update the position of the end effector with respect to a fruit or stalk or stem of a target fruit or bunch of fruits.

position and/or aperture of the end effector is dynamically updated or controlled by the computer vision subsystem.

position and/or aperture of the end effector is selected to allow the computer vision subsystem to gain confidence that the right fruit or stalk or stem has been selected.

computer vision subsystem is configured to detect one or more of the following: if a picking attempt has failed, if a picked fruit or bunch is damaged or rotten or if multiple stalks have been picked simultaneously.

computer vision subsystem is configured to determine if picking should be continued or if a fruit or bunch should be transported to a storage subsystem.

Rapid Release or Gripping of a Picked Stalk aperture of the end effector is increased or decreased using a non-actuated opening or closing mechanism.

single actuator is configured to move the cutter assembly against a spring force in order to close the end effector, and the end effector is configured to open upon removing power from the single actuator.

single actuator is configured to move the cutter assembly against a spring force in order to open the end effector, and the end effector is configured to close upon removing power from the single actuator.

Feature B: Adapting a Picked Stalk Length at the Point of Picking

A robot fruit picking system including an end effector mounted on a picking arm or other end effector positioning device, in which the picking arm is configured to position the end effector; and in which the end effector is configured to:

(i) encircle a stalk or stem of a fruit or bunch of fruits without severing it;

(ii) select a picked stalk length by sliding the end effector along the stalk towards or away from the fruit, and (iii) sever the stalk at a particular target length.

Section 2. Carousel

Feature A: A Storage Buffer Subsystem

A robot fruit picking system comprising an autonomous robot including:

a picking arm or other end effector positioning device;

an end effector mounted on the picking arm configured to either cut a fruit or stalk or stem for a specific fruit or bunch of fruits or pluck that fruit or bunch, and to transfer the fruit or bunch to a storage buffer subsystem;

and in which the storage buffer subsystem is configured to receive the fruit or bunch, and to transfer the fruit or bunch to a transportation or inspection or storage subsystem.

Feature B: A Storage Buffer Subsystem that Holds the Stem of the Fruit

A robot fruit picking system comprising an autonomous robot including:

a picking arm or other end effector positioning device;

an end effector mounted on the picking arm configured to either cut a fruit or stalk or stem for a specific fruit or bunch of fruits or pluck that fruit or bunch, and to transfer the fruit or bunch to a storage buffer subsystem;

and in which the storage buffer subsystem is configured to receive and hold the fruit or bunch by its stalk or stem, and to transfer the fruit or bunch to a transportation or inspection or storage subsystem.

Feature C: A Storage Buffer Subsystem that Moves Punnet (s) or Waste Chute Towards a Picked Fruit Instead A robot fruit picking system comprising an autonomous robot including:

a picking arm or other end effector positioning device;

an end effector mounted on the picking arm configured to either cut a fruit or stalk or stem for a specific fruit or bunch of fruits or pluck that fruit or bunch, and to transfer the fruit or bunch to a storage buffer subsystem;

and in which the storage buffer subsystem is configured to move a transportation or storage subsystem towards the picked fruit.

Optional Features:

Storage Buffer Subsystem storage buffer subsystem is configured to minimise handling the edible and palatable part of the fruit or other sensitive parts of the fruit that could be bruised by handling.

storage buffer subsystem is mounted on the autonomous robot.

storage buffer subsystem is external to the autonomous robot.

storage buffer subsystem is configured such that it carries picked fruits to or from locations on the picking arm through a route or path.

picking arm is configured to continue to transfer picked fruit onto the storage buffer subsystem until the storage buffer subsystem is full.

system includes multiple picking arms that are configured to transfer picked fruits onto one or more storage buffer subsystems.

storage buffer subsystem is shaped as a conveyer belt or carousel or magazine.

storage buffer subsystem includes clips or hooks or other opening or closing mechanisms at specific intervals that are configured to automatically open or close, such as by the action of a spring or electromagnet or solenoid.

storage buffer subsystem includes a pair of belts in contact with one another, arranged so the stalk or stem can be trapped between the outer surface of one belt and the inner surface of the other.

storage buffer subsystem is configured to release the picked fruit by locally separating the belts so that they can no longer grip the stalk or stem, such as by inserting a suitable separator between them storage buffer subsystem includes a laterally asymmetric chain that is configured to grip the fruit between the chain when wound clockwise and to release the fruit if wound anticlockwise.

storage buffer subsystem includes an elastic element (such as an elastic band) that is configured to grip the stalk or stem of the fruit or bunch when under tension, and that is configured to release the stalk or stem when the tension is decreased.

Inspection Subsystem the storage buffer subsystem includes a route or path that moves the picked fruit through an inspection subsystem.

inspection subsystem is configured to image a picked fruit from multiple relative viewpoints.

path is configured to prevent external light sources from interfering with the inspection subsystem.

inspection subsystem is configured to monitor the size and quality of the picked fruit or bunch and to grade a picked fruit or bunch and determine its suitability for retail or other use.

Storage Subsystem storage subsystem is configured to receive a picked fruit or bunch and store that fruit or bunch in containers for storage or transportation, or in punnets for retail;

storage subsystem includes one or more punnets and/or one or more waste chutes.

punnet(s) and waste chute(s) are positioned such that the storage buffer subsystem can release a picked fruit or bunch directly onto each individual punnet or waste chute of the storage subsystem.

punnets or trays of punnets are arranged into vertical stacks and are positioned to allow the storage buffer subsystem to pass between the punnets or trays of punnets.

storage subsystem is either mounted on the autonomous robot or is external to the autonomous robot.

storage subsystem is located outside a specific perimeter or guard from the picking arm.

each punnet or waste chute includes a memory or tag, such as an RFID or NFC tag or barcode.

tag is configured to store a machine readable unique ID.

tag is automatically programmed to store the time and/or date that the punnet was filled with fruits.

tag is programmed to determine and store the expiry date of the fruits stored in the punnet.

tag enables a user to scan the punnet with a reader device, and have the ID or the time and/or date that the pallet was filled, displayed at the reader device.

Packaging Arm a packaging arm is configured to transfer the picked fruit or bunch from the storage buffer subsystem to an inspection subsystem and/or a storage subsystem;

robot fruit picking system includes a packaging arm that is configured to transfer the picked fruit or bunch from the storage buffer subsystem to an inspection subsystem and/or a storage subsystem.

receiving a picked fruit or bunch from the end effector and moving it to the inspection system and the punnet or waste chute.

Fruit Holder robotic fruit picking system includes one or more fruit holders, such as a wall-mounted holders.

Magazine robotic fruit picking system includes a magazine capable of receiving the picked fruit for storage.

the packaging arm is able to receive the picked fruit from the magazine for transfer into a storage subsystem such as a punnet or waste chute.

Punnetization a probability distribution describing the size of picked fruits and other measures of quality is updated dynamically as a picked fruit is transferred onto the storage buffer subsystem.

a probability distribution describing the predicted size of yet-to-be-picked fruits from each picking arm and other measures of quality is updated dynamically.

storage buffer subsystem is configured to fill up punnets according to one or more specific punnetization rules.

punnetization rules include: at least a required total weight into each punnet, less than a required proportion of the fruits in each punnet differ in size or diameter by more than a predefined threshold, less than a required proportion of the fruits in each punnet exhibits a predefined shape or colour, such as unusual shape or blemish.

storage buffer subsystem is configured to allocate picked fruit into specific punnets in order to minimize a specific cost function that is a function of a grower's expected profit from supplying a given punnet or tray to a customer.

cost function take into account one or more of the following: known existing placement of picked fruit within the storage subsystem, known properties of picked fruit located on the storage buffer subsystem, expectation over many samples of future streams of yet-to-be-picked fruit, when each punnet of the storage subsystem must be removed for other storage or transportation, such as refrigeration or distribution.

Feature D: Hand Off Approach

A robot fruit picking system comprising an autonomous robot including:

a picking arm or other end effector positioning device;

an end effector mounted on the picking arm configured to either cut a stalk or stem for a specific fruit or bunch of fruits or pluck that fruit or bunch, and to transfer the fruit or bunch to a stalk holding device;

the stalk holding device being configured to grip the stalk or stem for the specific fruit or bunch.

Optional Features:

stalk holding device is also configured to cut the stalk or stem of the fruit or bunch.

when the picking end effector is configured to automatically release the stalk or stem when the stalk holding device has gripped the stalk or stem.

stalk holding device is configured to separate the stems or stalks of a bunch of fruits.

Feature E: Pallet Including a Machine Readable Unique ID

A robot fruit picking system comprising an autonomous robot including:

a picking arm or other end effector positioning device;

an end effector mounted on the picking arm configured to either cut a fruit or stalk or stem for a specific fruit or bunch of fruits or pluck that fruit or bunch, and to transfer the fruit or bunch to a storage buffer subsystem;

the storage buffer subsystem that is configured to move a storage subsystem towards the picked fruit;

in which the transportation or storage subsystem includes one or more pallets, each including a memory or tag, such as an RFID or NFC tag or barcode, that stores a machine readable unique ID.

Optional Features:

autonomous robot includes a wireless reader that is able to detect the presence or absence of the pallets in a specific area of interest.

autonomous robot is configured to automatically issue an alert when the reader has failed to detect a pallet.

tag is automatically programmed to store the time and/or date the pallet was filled with fruits.

tag is programmed to determine and store the expiry date of the fruits stored in the pallet.

tag enables a user to scan the pallet with a reader device, and have the ID or the time and/or date that the pallet was filled, displayed at the reader device.

Section 3. Controlling a Robot Team

Feature A: Multiple Robots Allocated into One or More Teams Using a Set of Physical Keys An agricultural robotic system for allocating multiple autonomous robots into a robotic team comprising:

multiple robots;

a set of physical keys associated with a robotic team; in which each physical key inside the set can be inserted into or removably attached to each robot in the robotic team;

and in which a robot is automatically configured to work within the robotic team when a physical key is inserted into the robot.

Optional Features:

robots are configured to operate autonomously.

system is configured to allow the one or more robots to operate autonomously based on specific conditions or environment, such as a recognised safe conditions or environment.

each robot is an autonomous agriculture robot, such as a crop harvesting or crop carrying or crop spraying robot.

Physical Key set of physical keys each store an identity uniquely associated with the robotic team;

set of physical keys is linked to a supervisor of the robotic team.

set of physical keys are configured to enable the robots to communicate with a particular wireless access point, such as a WIFI access point.

a physical key must be inserted into the robot to enable the robot to operate.

a physical key must be activated by a supervisor to enable the robot to operate.

physical keys among the same set of physical keys include the same visual identifier that defines a robotic team association.

visual identifier is one or more of a bright colours, a distinctive graphic, a distinctive shape, a casing having brail or other tactile markings.

the set of physical keys are configured to meet or enforce safety requirements including the maximum number of robots allowed within a robotic team.

safety requirements are configurable.

the system includes other physical keys which are configured for specific purposes, such as maintenance or reparation purposes.

physical key is configured to make sure robots do not travel into areas that could affect the performance of the robotic team.

physical key is configured to communicate with one or more external data sources, such as weather information or other environmental conditions.

physical key is programmed with or learns picking or harvesting strategies.

physical key includes a positioning subsystem configured to estimate or determine the position of each robot.

physical key is configured to program or store a robot's task within a robotic team, such as observation, picking, pruning, transporting, or a retrieval task.

physical key is configured to be removed from a robot when the robot should be removed from the team.

each robot is configured to automatically enter a sleep mode when the physical key has been removed from the robot.

Information Storage Module physical key includes an information storage module (ISM) that is configured to store robots or robotic teams related information.

information storage module includes a memory or tag, such as an NFC or RFID tag, that is machine readable.

robots and/or teams related information includes network information that authorises the connection of each robot within a team to a communication subsystem or wireless access point.

emergency stop subsystem set of physical keys is linked to an emergency stop subsystem.

emergency stop subsystem is configured to simultaneously stop specific actions of one or more robots or one or more robotic teams.

emergency stop subsystem is configured to simultaneously stop all the actions of all the robots within one or more robotic teams.

emergency stop subsystem is configured to automatically stop the actions of a robotic team if one or more robots in the robotic team is further than a predetermined distance from a supervisor.

supervisor is a human operator or a robot, such as a lead robot.

system includes an audio output for outputting information about the several robots and/or about the several robotic teams.

Robot's Work Path and Visually Identifiable Path Objects physical key is programmed with the robot's work path or trajectory within a robotic team.

work path comprises one or more path objects identifiable by the robot.

path objects are visually identifiable waypoints.

path objects are electrically identifiable waypoints path objects are acoustically identifiable waypoints.

path objects are electromagnetically identifiable waypoints.

path objects are arranged in a predetermined sequence and the robot moves between the path objects in a predetermined path.

the system is configured to assign each robotic teams to a specific work path.

path objects are configured to instruct a robot to automatically undertake a specific task.

Section 4. Determining the Ripeness of a Fruit

Feature A: Method of Determining the Ripeness of a Fruit Body by Applying a Known Excitation Force to the Fruit Stalk A method of determining the ripeness of a fruit, the method comprising: gripping the stalk or stem of the fruit using a fruit gripping device; applying a known excitation force to the fruit stalk; analysing the inertial response of the fruit; and determining the ripeness of the fruit body.

Optional Features:

known excitation force includes one or a combination of the following: gripping or vibrating or oscillating the stalk or stem of the fruit.

known excitation force is applied by the fruit gripping device.

the known excitation force is less than a force capable of detaching a fruit body and its receptacle.

the step of analysing the inertial response comprises the use of one or more strain gauges mechanically coupled to the fruit gripping device.

the method includes the step of estimating the mass of the fruit body.

the method includes the step of estimating the physical properties of the attachment between the receptacle and the body of the fruit.

a physical property includes the elasticity of the attachment between the receptacle and the body of the fruit.

the elasticity of the attachment is determined using the relative phase of the excitation force and the induced force and the estimated mass of the fruit body.

the fruit gripping device is configured to dampen an induced motion on the stalk or stem.

fruit gripping device is configured to grip the stalk or stem at a first point and to dampen the induced motion at a second point.

another fruit gripping device is used to dampen an induced motion of the stalk or stem.

Feature B: Fruit Picking Device

A robotic fruit picking system including a fruit picking device that implements any of the methods above.

Optional Features:

system includes a mass sensor device.

system includes a force sensor device.

system includes a computer processor is capable of calculating the ripeness of the fruit body from the output from one or more mass sensor devices and one or more force sensors.

Section 5. Storing System for Multiple Robots

A system for transporting and storing one or more robots, the system comprising:

a container for housing the robot(s);

in which the system is configured such that the robot(s) can automatically load or unload from the container;

and in which the container is configured to simultaneously transport or store the robot(s).

Optional Features:

container is configured to transport or store a robotic team as a single entity, such as a robotic team as defined in Section 3 above.

container is configured to be transported by a lorry or container ship.

container is configured to securely house the robot(s).

container is configured to be able to automatically deploy the robot(s) in a field.

container is configured to be transported by a transportation vehicle, such as a fork lift.

container is configured to move using powered wheels with tracks or rails.

when a robot enters or approaches the container, the container is configured to detect the robot status in real time.

robot is an autonomous agricultural robot, such as a fruit picking, crop harvesting or crop carrying or crop spraying robot.

Docking Station container includes one or more docking stations, each docking station includes a power supply and a power interface for connecting the power supply of the robot (s).

power interface is a wireless power interface.

docking station enables the robot(s) to offload log data captured in the field.

docking station is able to share log data or any robot status related information to a communication subsystem.

Communication Subsystem system includes a communication subsystem configured to enable the robot(s) to automatically share status related information, such as remaining battery power level, temperature, location, to an external supervisor subsystem.

communication subsystem uses WiFi or other wireless techniques.

Markers container includes one or more visually identifiable targets or markers that the robot(s) are configured to follow using a computer vision subsystem.

container includes a cable or rope that the robot(s) are configured to follow in order to load or unload from the container.

container includes a route that the robot(s) are configured to follow in order to load or unload from the container.

container includes RFID transponders or tags that the robot(s) are configured to follow using near field communication.

Section 6. Lean Compensation Subsystem

Feature A: Lean Compensation Subsystem that Adjusts the Shape of the Robot

A robot fruit picking system comprising an autonomous robot, the robot fruit picking system including:

an end effector mounted on a picking arm or other end effector positioning device, in which the picking arm is configured to position the end effector;

a lean compensation subsystem that is configured to adapt or adjust the shape of the autonomous robot depending on a specific operation that the robot is undertaking.

Optional Features:

shape of the robot is adapted to compensate for uneven or sloping ground.

shape of the robot is adapted to compensate for uneven or sloping ground along a row of plants.

shape of the robot is adapted such that the autonomous robot is configured to avoid obstacles.

shape of the robot is adapted such that the autonomous robot is configured to efficiently pick a fruit or bunch of fruits.

shape of the robot is continuously adapted as the robot moves along a crop row.

shape of the robot is automatically adapted when the robot stops moving.

shape of the robot is adapted in advanced based on a pre-programmed route that the robot has to follow.

the pre-programmed route logs any changes in the shape of the sectional area of a crop row.

adapting the shape of the robot includes adapting the pitch and/or roll of the robot.

lean compensation subsystem comprises one or more springs and a winch, and in which the shape of the robot is adapted by compressing the springs using the winch.

the system includes a mobile chassis that includes a base frame and, and in which the lean compensation subsystem is configured to adjust the lean compensation of the robot on the mobile chassis such that a center of mass for the mobile chassis is determined depending on the specific operation that the robot is undertaking.

lean compensation subsystem is configured to provide simultaneous and independent lean compensation of the centre of mass of the mobile chassis about an axis by adjusting the position of the movable counterweight relative to the mobile chassis in a direction substantially opposite to the axis of the mobile chassis.

lean compensation is electromechanically operated.

system includes sensors, such as accelerometers or visual sensors, configured to provide feedback related to the mobile chassis orientation.

control subsystem receives the sensors information and is configured to determine a suitable position of the counterweight to maintain optimum centre of mass for the mobile chassis.

counterweight is achieved using an actuator or motor.

actuator or motor is coupled to a spring by a tensioning element or by other movement means such as one or more rack or pinion mechanisms.

counterweight is achieved using one or more weights selected to counterbalance the weight of the mobile chassis.

lean compensation subsystem includes heavy component items of the robot, such as batteries or containers, in order to reduce the overall total weight and manufacturing cost of the robot chassis.

specific operation includes: picking a fruit or bunch, transporting, moving, imaging or analysing a fruit or bunch.

Feature B: Improved Image Capture

A robot fruit picking system comprising an autonomous robot, the robot including multiple picking arms, in which each picking arm is configured to move an attached camera to enable a computer vision subsystem to locate fruits and determine their suitability for picking.

Optional Features:

computer vision subsystem is configured to determine the impact of the motion of a second picking arm on the pose of a first picking arm in order to adjust the pose of the first picking arm to compensate for the motion of the second picking arm.

the impact of the motion of one picking arm on the position of another picking arm is predicted using a predetermined physical model of the arms and the elastic properties of the suspension to measure the chassis lean induced by arm motion.

the impact of the motion of one picking arm on the position of another picking arm is measured to determine the chassis lean induced by arm motion.

control subsystem is configured to limit the motion effect on the first picking arm by the second picking arm movement on the pose of the first picking arm by reducing the acceleration or velocity or reach of the second picking arm.

control subsystem is configured to reduce the acceleration or velocity or reach of the second picking arm to an extent that depends on the degree to which coupled motion is undesirable.

computer vision subsystem is configured to capture an image with a first picking arm while using a second picking arm to counterbalance.

the counterbalance is achieved by using feedback from a sensor, such as an accelerometer, to drive the second picking arm head in opposite direction.

control subsystem is configured to enable a first picking arm to rotate and pan its image acquiring camera such as to minimise motion blur.

Feature C: Tracked Vehicle Including a Wheeled Drive Subsystem

A robot fruit picking system comprising an autonomous robot, in which the robot is a tracked vehicle capable of autonomously engaging a wheeled drive subsystem.

Optional Features:

wheeled drive subsystem comprises a robot chassis coupled to a drive motor, a drive selector mechanism, a track drive unit and a retractable wheeled drive unit.

wheeled drive subsystem comprises two or more tracks mounted on a track chassis and mechanically coupled to the drive motor.

wheeled drive subsystem comprises at least three wheels mounted on one or more-wheel chassis units and mechanically coupled to the drive motor.

the wheel chassis unit is coupled to the robot chassis and configured so as to be retractable within the robot chassis to an extent the lowest edge of the wheels when retracted are above the highest level of the tracks.

drive selector mechanism is configured so as to control the retractation of the wheeled drive unit and comprises a drive selector mechanism controller and a retraction gear coupled to the wheeled drive unit and the drive motor.

drive selector mechanism controller is further controlled by, or be incorporated within, the robots operating hardware.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A robot fruit picking system comprising an autonomous robot, the robot fruit picking system including:

(a) a computer vision subsystem configured to analyse images of fruit to be picked and to determine a picking position; and (b) an end effector mounted on a picking arm or other end effector positioning device, in which the picking arm is configured to position the end effector;

in which the position and/or aperture of the end effector is dynamically updated or controlled by the computer vision subsystem, in which the end effector includes an aperture that can be changed dynamically by driving a single actuator in order to either grip, cut or release a fruit or a stalk or stem of a fruit or bunch of fruits;

in which the end effector comprises a set of jaws and a cutter assembly that slides along the set of jaws, the set of jaws being configured to grip the fruit or stalk or stem of the fruit or bunch of fruits.

2. The robot fruit picking system of claim 1, in which the aperture is changed dynamically in order to increase the probability of picking success of a target fruit or bunch of fruits.

3. The robot fruit picking system of claim 2, in which the probability of picking success for a target fruit is estimated by taking account one or more of the following: obstacles near a fruit or stalk or stem of interest, position of target fruit or stalk or stem, environmental conditions.

4. The robot fruit picking system of claim 1, in which the gripping, cutting, or releasing actions of the end effector are performed without having to move the picking arm.

5. The robot fruit picking system of claim 1, in which the aperture of the set of jaws is configured to change based on the sliding action of the cutter assembly along the set of jaws.

6. The robot fruit picking system of claim 1, in which the set of jaws is configured to normally spring open.

7. The robot fruit picking system of claim 1, in which the picking arm is configured to position the set of jaws on either side of a fruit or stalk or stem of a fruit or a bunch of fruits to be picked.

8. The robot fruit picking system of claim 1, in which the cutter assembly includes a cutting blade.

9. The robot fruit picking system of claim 1, in which the cutter assembly is driven off a single actuator or motor.

10. The robot fruit picking system of claim 1, in which the cutter assembly is configured to be pushed or moved forward in order to close or squeeze together the set of jaws and pull the stalk or stem toward the cutting blade.

11. The robot fruit picking system of claim 1, in which the jaws are barbed jaws.

12. The robot fruit picking system of claim 1, in which the cutter assembly is configured to be pushed or moved backward in order to release the picked fruit or bunch of fruits.

13. The robot fruit picking system of claim 1, in which the aperture of the set of jaws can be selected such that the set of jaws can be configured to be only partially closed around the fruit or stalk or stem so as to encircle the fruit or stalk or stem without applying significant force or cutting to the fruit or stalk or stem.

14. The robot fruit picking system of claim 1, in which the computer vision subsystem includes a stereo camera.

15. The robot fruit picking system of claim 1, in which the 3D position of the end effector is inferred from 2D images.

16. The robot fruit picking system of claim 1, in which the end effector includes fiducial markers.

17. The robot fruit picking system of claim 1, in which the 3D position of the end effector is used to update the positioning of the picking arm and/or the positioning of the end effector with respect to a target fruit or stalk or stem of a target fruit or bunch of fruits.

18. The robot fruit picking system of claim 1, in which the position of the cutter assembly with respect to the 3D position of the end effector is used to update the position of the end effector with respect to a target fruit or stalk or stem of a target fruit or bunch of fruits.

19. The robot fruit picking system of claim 1, in which the position and/or aperture of the end effector is selected to allow the computer vision subsystem to gain confidence that the right fruit or stalk or stem has been selected.

20. The robot fruit picking system of claim 1, in which the computer vision subsystem is configured to detect one or more of the following: if a picking attempt has failed, if a picked fruit or bunch is damaged or rotten or if multiple stalks have been picked simultaneously.

21. The robot fruit picking system of claim 1, in which the computer vision subsystem is configured to determine if picking should be continued or if a fruit or bunch should be transported to a storage subsystem.

22. The robot fruit picking system of claim 1, in which a single actuator is configured to move the cutter assembly against a spring force in order to close the end effector, and the end effector is configured to open upon removing power from the single actuator.

23. The robot fruit picking system of claim 1, in which a single actuator is configured to move the cutter assembly against a spring force in order to open the end effector, and the end effector is configured to close upon removing power from the single actuator.

24. A method of picking a fruit using a robot fruit picking system, the method comprising the steps of:

(a) analysing images of fruit to be picked and determining a picking position with a computer vision subsystem;

(b) positioning an end effector using a picking arm or other end effector positioning device;

(c) dynamically updating or controlling the position and/or aperture of the end effector using the computer vision subsystem; and (d) driving a single actuator in order to either grip, cut or release a fruit or a stalk or stem of a fruit or bunch of fruits;

in which the end effector comprises a set of jaws and a cutter assembly that slides along the set of jaws, the set of jaws being configured to grip the fruit or stalk or stem of the fruit or bunch of fruits.

25. A fruit picking end effector for a robot fruit picking system, the end effector being mountable on a picking arm or other end effector positioning device, the end effector comprising a set of jaws and a cutter assembly that slides along the set of jaws; the set of jaws being configured to grip the fruit or stalk or stem of the fruit or bunch of fruits, in which the end effector includes an aperture that can be changed dynamically by driving a single actuator.

* * * * *